(12) United States Patent
Koide

(10) Patent No.: US 8,389,620 B2
(45) Date of Patent: Mar. 5, 2013

(54) DIP FORMING LATEX COMPOSITION CONTAINING CROSSLINKING AGENT AND DIP FORMED ARTICLE OBTAINED THEREFROM

(75) Inventor: Kazuo Koide, Yotsukaido (JP)

(73) Assignee: Four Road Research Ltd., Chiba (JP)

( * ) Notice: Subject to any disclaimer, the term of this patent is extended or adjusted under 35 U.S.C. 154(b) by 797 days.

(21) Appl. No.: 12/052,964

(22) Filed: Mar. 21, 2008

(65) Prior Publication Data

US 2008/0207809 A1    Aug. 28, 2008

Related U.S. Application Data

(63) Continuation-in-part of application No. 11/965,629, filed on Dec. 27, 2007, now abandoned, which is a continuation-in-part of application No. PCT/JP2007/062791, filed on Jun. 26, 2007.

(30) Foreign Application Priority Data

Jun. 30, 2006 (JP) ................................ 2006-180764

(51) Int. Cl.
*C08K 5/56* (2006.01)
*C07F 5/06* (2006.01)

(52) U.S. Cl. ........ 524/500; 524/457; 525/191; 525/370; 525/371; 556/170

(58) Field of Classification Search .............. 2/167, 168; 264/301; 428/35.2, 35.5, 35.7, 36.8, 492, 428/500, 521; 524/399, 522; 525/54.3, 57, 525/187, 218, 370, 363; 556/55, 179, 181, 556/183

See application file for complete search history.

(56) References Cited

U.S. PATENT DOCUMENTS

| | | | | |
|---|---|---|---|---|
| 3,682,688 | A * | 8/1972 | Hughes et al. | 427/384 |
| 5,438,101 | A * | 8/1995 | Yamamoto et al. | 525/274 |
| 6,670,002 | B1 * | 12/2003 | Sekiguchi et al. | 428/32.34 |
| 6,939,617 | B2 * | 9/2005 | Koide et al. | 428/492 |
| 2002/0101007 | A1 * | 8/2002 | Koide et al. | 264/301 |
| 2004/0202706 | A1 | 10/2004 | Koo et al. | |
| 2005/0031884 | A1 * | 2/2005 | Koide et al. | 428/521 |

FOREIGN PATENT DOCUMENTS

| | | |
|---|---|---|
| JP | 2000-351787 | 12/2000 |
| JP | 2001-192918 | 7/2001 |
| JP | 2002-161171 | 6/2002 |
| JP | 2003-165814 | 6/2003 |
| JP | 2005-015514 | 1/2005 |
| JP | 2005-097217 | 4/2005 |
| WO | WO 0244262 A1 * | 6/2002 |
| WO | WO 2004/071469 | 8/2004 |

OTHER PUBLICATIONS

Starmer, "Effect of Metal Oxides on the Properties of Carboxyl Nitrile Rubber Vulcanisates," *Plastics and Rubber Processing and Applications*, vol. 9, No. 4, pp. 209-214, 1998.
Zakharov, "Vulcanization of Carboxylic Rubbers," *Rubber Chemistry and Technology*, vol. 36, No. 2, pp. 568-574, Apr.-Jun. 1963.
Notice of Reason for Rejection mailed on Jul. 21, 2009 in a corresponding Japanese Patent Application No. 2008-522585.

* cited by examiner

*Primary Examiner* — Ling Choi
*Assistant Examiner* — Darcy D Laclair Lynx
(74) *Attorney, Agent, or Firm* — Knobbe, Martens, Olson & Bear LLP

(57) ABSTRACT

A dip-forming composition, comprising:
a carboxyl group-containing diene-based rubber latex; and
one or more compounds selected from the following (a) to (e):
(a) an organometallic crosslinking agent containing two or more hydroxyl groups each bonded to a metal atom;
(b) a cationic property-deactivated modified polyamine-based resin, a cationic property-deactivated polyamide-epichlorohydrin resin, a cationic property-deactivated polyamine-epichlorohydrin resin, a cationic property-deactivated amine group- or quaternary ammonium base-containing polyvinyl alcohol, a cationic property-deactivated amine group- or quaternary ammonium base-containing polyacrylamide, a cationic property-deactivated amine group- or quaternary ammonium base-containing carbohydrate, or a polyacrylamide, polyvinyl alcohol, or carbohydrate into which a crosslinkable functional group is introduced;
(c) an anionic or nonionic polyvinyl alcohol, anionic or nonionic polyacrylamide, or anionic or nonionic carbohydrate to which a water resistant additive or water-resistant polymer is added;
(d) a water resistant polyvinyl alcohol; and
(e) a cationizing agent.

19 Claims, No Drawings

DIP FORMING LATEX COMPOSITION CONTAINING CROSSLINKING AGENT AND DIP FORMED ARTICLE OBTAINED THEREFROM

CROSS-REFERENCE TO RELATED APPLICATIONS

This application is a continuation-in-part of U.S. application Ser. No. 11/965,629, filed Dec. 27, 2007 which is a continuation-in-part of PCT/JP2007/062791, filed Jun. 26, 2007, which was published in a non-English language, which claims priority to JP Application No. 2006-180764, filed Jun. 30, 2006.

TECHNICAL FIELD

The present invention relates to a novel carboxyl group crosslinking agent and a latex composition containing the crosslinking agent, and a crosslinked molded article of the latex composition or a crosslinked molded article of a product containing the latex composition, and more specifically, to a carboxyl group-containing diene-based rubber latex composition using as a crosslinking agent an organometallic compound having two or more hydroxyl groups each bonded to a metal atom such as an aluminum atom or a titanium atom and a crosslinked molded article of the composition, and a hypoallergenic dip-formed article, paper product, or the like excellent in creep resistance, water resistance, solvent resistance, and durability. The present invention also relates to a carboxyl group-containing diene-based rubber latex composition comprising a carboxyl group-containing diene-based rubber latex and one or more compounds selected from (b) a cationic property-deactivated modified polyamine-based resin, a cationic property-deactivated polyamide-epichlorohydrin resin, a cationic property-deactivated polyamine-epichlorohydrin resin, a cationic property-deactivated amine group- or quaternary ammonium base-containing polyvinyl alcohol, a cationic property-deactivated amine group- or quaternary ammonium base-containing polyacrylamide, a cationic property-deactivated amine group- or quaternary ammonium base-containing carbohydrate, or polyacrylamide, polyvinyl alcohol, or carbohydrate into which a crosslinkable functional group is introduced, (c) an anionic or nonionic polyvinyl alcohol, anionic or nonionic polyacrylamide, or anionic or nonionic carbohydrate to which water resistant additive or water resistant polymer is added, (d) a water resistant polyvinyl alcohol, (e) a cationization agent, and relates to a crosslinked molded article such as dip-formed article of the composition.

BACKGROUND ART

Dip-formed articles such as rubber gloves and finger cots have been widely used in various fields including a medical field (such as the prevention of hospital infection or infection with SARS), a food processing field (such as 0-157 problems), and an electronic part production field in association with a growing interest in safety and sanitation. A dip forming method is one method of producing each of the rubber gloves, the finger cots, and the like. Known examples of the dip forming method include an anode coagulant dipping method involving previously dipping a mold made from, for example, wood, glass, ceramic, metal, or plastic into a coagulant liquid and dipping the resultant into a natural rubber latex composition or a synthetic rubber latex composition and a Teague coagulant dipping method involving dipping a mold into a latex composition and dipping the resultant into a coagulant liquid, and molded products obtained by these dip forming methods are dip-formed articles.

A natural rubber latex is a representative latex for dip forming. A natural rubber latex product has good physical and chemical properties, but the user may suffer from an allergic reaction in association with the elution of a natural protein in the product, so the number of products each produced by using a protein-free synthetic rubber latex tends to increase.

It has been pointed out that an acrylonitrile-butadiene rubber (NBR rubber), which is a representative example of the synthetic rubber latex, may generate a harmful substance such as hydrogen cyanide originating from acrylonitrile in an exhaust gas, so a new latex raw material such as a styrene-butadiene rubber (SBR) (JP-A-2001-192918) or a carboxyl group-containing ionomer-based elastomer has been attracting attention.

High levels of physical properties are desired for article. A crosslinked structure must be introduced between the molecules of a polymer of which the dip-formed article is composed in order that the dip-formed article may exert high levels of physical properties.

In the case of a natural rubber, sulfur and a vulcanization accelerator such as zinc oxide are added to form the covalent bond of sulfur between the double bonds of the molecules of the natural rubber. In the case of the natural rubber, the so-called sulfur vulcanization is considered to form a crosslinked structure even in a natural rubber particle, so the resultant product exerts excellent physical properties.

The same sulfur vulcanization method as that in the case of the natural rubber is generally adopted also in the case of a diene-based carboxylated synthetic rubber latex. However, the role of each chemical to be added is considerably different from that in the case of the vulcanization of a natural rubber latex. That is, when zinc oxide contacts with water, a hydroxyl group is produced on the surface of zinc oxide, and the hydroxyl group reacts with a carboxyl group of a particle of the diene-based carboxylated synthetic rubber latex (P. H. Starmer, Plastics and Rubber Processing and Applications, 9 (1988), 209-214) to form a pendant half salt, and, furthermore, cluster ion crosslinkage may be formed after a heat drying process for the pendant half salt. The physical properties of the surface of zinc oxide to be measured, such as a tensile strength, an elongation, and a hardness are determined by the zinc crosslinkage, which is a major difference from the case of the natural rubber latex where the physical properties of a product are determined by sulfur crosslinkage.

The term "cluster ion crosslinkage" as used herein refers to a state where carboxyl groups form a cluster, and a divalent cation of zinc is neutralized by the whole carboxyl groups forming the cluster. The structure of the cluster ion crosslinkage has the following characteristic: when rubber is elongated, crosslinkage is misaligned, and, when a stress is applied to the rubber, the rubber undergoes stress relaxation (creep) within a short time period, and, if used for a long time period, its permanent distortion enlarges, with the result that the rubber elongates (N. D. Zakharov, Rubber Chem. and Tech, Rubber Division Acs. Akron, US. Vol 36, no 3, 568-574).

On the other hand, sulfur, which crosslinks double bonds originating from butadiene with a covalent bond, has small influences on the physical properties of a rubber product to be measured, such as a tensile strength, an elongation, and a hardness. However, sulfur dominates the important properties of the rubber product, such as the durability, creep resistance, water resistance, and solvent resistance of the rubber product, and the fact is the reason why a sulfur vulcanization method is frequently adopted also in carboxylated synthetic rubber latices.

As described above, sulfur vulcanization plays an important role also in a diene-based carboxylated synthetic rubber latex. On the other hand, in the electronic part production field, the frequency at which the sulfur vulcanization is employed tends to reduce because sulfur oxidizes a metal when sulfur contacts with the metal.

In addition, the development of a dip-formed article using no vulcanization accelerator has been demanded because there has been a tendency for the number of cases where contact dermatitis based on a delayed allergy against a vulcanization accelerator in a dip-formed article such as a glove occurs to increase in recent years.

Further, in a food field, there has been a tendency to step up controls on the eluted amount of zinc as a heavy metal to elute from a rubber glove.

By the way, the inventors of the present invention have proposed a method involving the use of, for example, an aluminate as a crosslinking method in which neither sulfur nor a vulcanization accelerator is used (JP 3635060 B). However, the method has the following drawback: a rubber product becomes hard because aluminum functions as a trivalent cation.

In addition, JP-A-2003-165814 proposes a dip-forming composition substantially free of a sulfur-containing vulcanizer, a vulcanization accelerator, and zinc oxide. However, investigation conducted by the inventors of the present invention has shown that a dip-formed article using the composition involves the problems in that the product is poor in creep resistance, water resistance, and solvent resistance, and has strong cohesiveness.

It should be noted that WO 2004/071469 discloses a hydrogel patch composition. The hydrogel patch composition contains a water-soluble polymer gel and a crosslinking agent, and the crosslinking agent contains dihydroxyaluminum acetate. However, dihydroxyaluminum acetate is interpreted as a cationic crosslinking agent for the water-soluble polymer gel. However, neither the cationic crosslinking agent of a gelled composition nor a cationic crosslinking agent for gelling a composition can be a crosslinking agent for a carboxyl group-containing diene-based rubber latex where the stable, long-term presence of a blended liquid is most important. In addition, the document has no description concerning what action mechanism the crosslinking agent has on the water-soluble polymer gel.

In addition, JP-A-2005-97217 discloses a gel sheet for bleaching containing, as a component, an ion crosslinked article of an anionic water-soluble polymer compound, which is obtained by polymerizing acrylic acid or a derivative of acrylic acid, with a polyvalent cationic compound, and describes dihydroxyaluminum aminoacetate as the polyvalent cationic compound. However, the crosslinking agent is also a gelling agent for the anionic water-soluble polymer compound, and is gelled by being left at rest for 24 hours. Therefore, the document does not disclose a crosslinking agent for a carboxyl group-containing diene-based rubber latex according to the present invention any more than WO 2004/071469.

Further, JP-A-2005-15514 discloses a composition for a water-dispersed type rust preventive coating containing, as essential ingredients, an ionomer resin, specifically, an ethylene-unsaturated carboxylic acid copolymer and a water-soluble titanium compound having reactivity with a carboxyl group, and describes dihydroxytitanium lactate as the water-soluble titanium compound. However, the ionomer resin is a special resin that can be neutralized with a divalent or trivalent metal ion, so the document does not disclose the crosslinking agent for a carboxyl group-containing diene-based rubber latex according to the present invention.

DISCLOSURE OF THE INVENTION

An object of the present invention is to discover a crosslinking agent capable of replacing zinc oxide. Another object of the present invention is to discover a crosslinking agent capable of replacing sulfur and a sulfur-containing vulcanizer. The present invention aims to provide, by using any such crosslinking agent, a hypoallergenic crosslinked molded article, in particular, a dip-formed article which has physical properties such as durability, creep resistance, water resistance, and solvent resistance comparable to those of a conventional sulfur-vulcanized product and is free of sulfur, a sulfur-containing vulcanizate, and a vulcanization accelerator. Further, the present invention provides a latex composition free of zinc oxide. The present invention provides a new product even in a paper coating field by utilizing the latex composition.

The inventors of the present invention have paid attention to the crosslinkage formation behavior of zinc oxide. That is, as described above, when zinc oxide contacts with water, hydroxyl groups are produced on part of the surface of zinc oxide, and the hydroxyl groups crosslink the carboxyl groups of a carboxylated latex (P. H. Starmer, Plastics and Rubber Processing and Applications vol. 9 (1988), p 209-214).

Such reaction mechanism of zinc oxide suggests the possibility that a hydroxyl group bonded to a metal atom reacts with a carboxyl group.

In view of the foregoing, the inventors of the present invention have paid attention to an organometallic compound having two hydroxyl groups each bonded to a metal atom. If a hydroxyl group bonded to the metal atom reacts with a carboxyl group as in the case of zinc oxide, the organometallic compound will crosslink carboxyl groups.

With a view to demonstrating the inference, the inventors of the present invention have produced a dip-formed article by adding, to a latex containing carboxyl groups to which zinc oxide has been added, a dihydroxy organic aluminum metal compound having two hydroxyl groups each bonded to an aluminum atom or dihydroxy organic titanium compound. As a result, the inventors have found that such dihydroxy organometallic compound crosslinks the carboxyl groups. Moreover, to the inventors' surprise, the resultant product was a dip-formed article excellent in durability, creep resistance, and water resistance, these properties being comparable to those of a sulfur-vulcanized product. Moreover, the peeling property of the product was significantly improved.

Thus, the use of a dihydroxy organometallic compound was able to solve insufficient creep resistance and insufficient water resistance as drawbacks inherent in cluster ion crosslinkage by zinc oxide. A hydroxyl group of the dihydroxy organometallic compound may form a metal ester-like bond with a carboxyl group.

In association with the foregoing, a hypoallergenic dip-formed article free of a sulfur-containing vulcanizate and a vulcanization accelerator was obtained, whereby the present invention was completed.

In addition, a soft product with a good texture can be obtained because the dihydroxy organometallic compound forms divalent crosslinkage as in the case of sulfur vulcanization.

Further, a product having such physical performance that the product can be put into practical use can be produced even by adding the above dihydroxy organic aluminum metal compound alone.

In addition, not only a dihydroxy organic aluminum metal compound having two hydroxyl groups bonded to one metal atom but also an organic aluminum metal compound having, in any one of its molecules, multiple structures in each of which one aluminum metal atom has one hydroxyl group or an organic aluminum compound having multiple structures in each of which two hydroxyl groups are bonded to one metal atom and multiple structures in each of which one hydroxyl group is bonded to one aluminum metal atom has a crosslinking ability.

Further, it has been revealed that a compound having two hydroxyl groups each bonded to a titanium atom is also a divalent crosslinking agent, and effectively crosslinks the molecules of a carboxyl group-containing diene-based rubber latex.

The non-cohesiveness of a product is important quality demanded of a carboxyl group-containing diene-based rubber latex crosslinked molded article, in particular, a dip-formed article. One typically copes with the demand by coating or chlorinating the product.

The use of the organometallic crosslinking agent according to the present invention significantly reduces the cohesiveness of a product because the crosslinking agent is bonded to a carboxyl group that causes a hydrogen bond. In addition, a crosslinking agent having a structure with high hydrophobicity exerts the reducing effect to a larger extent than a crosslinking agent having a structure with low hydrophobicity. In view of the foregoing, the inventors of the present invention have synthesized an organometallic crosslinking agent having high hydrophobicity. The use of the crosslinking agent significantly alleviated the cohesiveness of a dip crosslinked molded article.

Next, the inventors of the present invention have attempted to improve the hydrophobicity of a product by adding an organometallic compound according to the present invention and a compound having a hydrophobic structure to a carboxylated diene-based rubber latex.

First, an aluminum disoap of a carboxylic acid was added. The disoap of the carboxylic acid does not function as a crosslinking agent because the disoap has only one hydroxyl group, but the disoap is bonded to a carboxyl group, and, furthermore improves the hydrophobicity of the crosslinked molded article because the disoap has two hydrophobic structures. Therefore, the non-cohesiveness of the crosslinked molded article of the latex composition was significantly improved.

In addition, when a salt of a carboxylic acid containing a hydrophobic group is added to the latex, the organometallic crosslinking agent fixes the carboxylic acid to improve the hydrophobicity of the crosslinked molded article, thereby contributing to the impartment of non-cohesiveness to the crosslinked molded article. When the molded article is a dip-formed article, the carboxylic acid is fixed to the product by a calcium salt of a coagulant as well.

The carboxylic acid containing a hydrophobic group, which is typically added in the form of a water-soluble carboxylate to the latex, can be emulsified before being added like a rosin emulsion sizing agent.

Further, the inventors of the present invention have proposed the addition of a hydrophobic substance turned into an emulsion or a dispersion to the latex. As the emulsion or dispersion of the hydrophobic substance, there are exemplified an emulsion and dispersion of a petroleum resin, a rosin ester, a surface sizing agent, (rosin ester-based, styrene maleic acid resin-based, styrene acryl copolymer-based, styrene acryl emulsion-based, acryl copolymer-based, olefin-maleic acid resin-based, urethane-based, AKD-based, or the like), a wax, a low-molecular-weight polyethylene, a low-density polyethylene, a low-molecular-weight polypropylene, a ethylene-based elastomer, or a ethylene-vinyl acetate copolymer.

In addition, an organic loading material such as a styrene polymer or an alkyl methacrylate polymer also improves the hydrophobicity of the crosslinked molded article to contribute to the impartment of non-cohesiveness to the product.

As described above, the mere internal addition of the organometallic crosslinking agent of the present invention and the compound having a hydrophobic structure to the diene-based rubber latex made it possible to impart non-cohesiveness to the product even when the organometallic crosslinking agent had no hydrophobic structure.

The inventors of the present invention have further attempted to add an organic aluminum metal crosslinking agent or an organic titanium metal crosslinking agent to a magnesium hydroxide system and/or a calcium hydroxide system in coexistence with sodium hydroxide and/or potassium hydroxide.

As a result, the inventors were able to obtain a molded article having good creep resistance and good water resistance.

The inventors of the present invention have conducted investigation on a water-soluble polymer to be added to a latex raw material next again. The addition of the water-soluble polymer to the latex raw material generally tends to reduce the tensile strength (detergent resistance) of a product after the product has been dipped into a detergent.

However, the addition of a nonionic or anionic polyvinyl alcohol, or a nonionic polyacrylamide did not reduce the detergent resistance. In addition, the addition of an anionic polyacrylamide reduced the detergent resistance, but the addition of a small amount of the organometallic crosslinking agent according to the present invention capable of functioning as a water resistant additive suppressed the reduction in detergent resistance.

In addition, a nonionic or anionic polyvinyl alcohol, or a nonionic or anionic polyacrylamide provided the product with sufficient durability and sufficient creep resistance in a use environment where the product was out of contact with water.

Dip-formed articles were each tested for water resistance after one had worn each of the products. Each of the products had sufficient water resistance in the early stage of wearing, but a test conducted 5 hours after the wearing of the products showed that each product to which a nonionic or anionic polyvinyl alcohol, or a nonionic or anionic polyacrylamide had been added absorbed water to swell within a short time period.

However, a product to which a nonionic or anionic polyvinyl alcohol, or an anionic polyacrylamide with an added water resistant additive had been added showed good water resistance even after one had worn the product for 5 hours.

Next, a condensation resin composed of polyalkylene polyamine and a dibasic carboxylic acid (modified polyamine-based resin) shows no cationic property when the resin is subjected to colloidal titration at a pH of 8.5±1.0.

The colloidal titration involves: measuring the total cationic activity of a sample with its pH adjusted to 3; and measuring the cationic activity of the sample originating from a quaternary ammonium base with the pH adjusted to 9. Then, a difference between the total cationic activity and the cationic activity originating from a quaternary ammonium base is defined as cationic property originating from an amine group.

Although a modified polyamine-based resin (condensation resin composed of polyalkylene polyamine and a dibasic carboxylic acid) that does not show the cationic property can be easily added to a latex raw material, a product to which the resin has been added has water resistance, creep resistance, water resistance in the early stage of wearing, and water resistance after wearing for 5 hours.

In view of the foregoing, the inventors of the present invention have conducted investigation as to whether or not a cationic or amphoteric polyacrylamide had cationic property by colloidal titration with the pH of the polyacrylamide adjusted to 9.0. The investigation showed that a polyacrylamide having an amine group lost cationic property while a polyacrylamide having a quaternary ammonium base showed cationic property.

A latex raw material was blended with a polyacrylamide with its pH adjusted to 7 or more, or preferably 9 or more to lose cationic property on the basis of these findings. As a result, a dip-formed article obtained by the blending had water resistance, creep resistance, water resistance in the early stage of wearing, and water resistance after wearing for 5 hours.

The cationic property of a polyvinyl alcohol having an amine group can also be lost by adjusting the pH of the alcohol in the same manner as that described above.

A polyacrylamide is different from any other polyamide in that an amine of which an amide bond is formed is —$NH_2$. The characteristic enables the synthesis of a nonionic polyacrylamide by the polymerization of acrylamide molecules. That is, an amide structure does not provide cationic property. Accordingly, the following idea is conceivable: the cationic property of a polyacrylamide into which an amine structure has been introduced can be easily lost by pH adjustment.

In addition, a polyvinyl alcohol has no amide structure. Therefore, as indicated by the findings obtained by colloidal titration, cationic property originating from an amine group is lost in a weak alkaline region.

Here, a cationic polyacrylamide or cationic polyvinyl alcohol having an amine group is supplied with an anion as a counter ion by adding an inorganic acid or an organic acid (also referred to as "water-soluble acid") after its synthesis, whereby the synthesized material is cationized. Therefore, an amine group-containing polymer to which no acid has been added (having no cationic property) has only to be directly added to a latex raw material.

Next, the inventors of the present invention have conducted investigation on a method of deactivating the cationic property of a polymer containing a quaternary ammonium base. The quaternary ammonium base is always positively charged, and it may be difficult to deactivate the cationic property.

For example, a latex blended liquid to which a polyamide-epichlorohydrin resin (polyamide epoxy resin) (trade name WS4030, manufactured by SEIKO PMC CORPORATION) and a nonionic alkylketene dimer had been added was stably present at the outset, the formation of a latex dip-formed article film from the liquid was attained, and the film had good quality. However, 2 days after the formation, the film coagulated. The addition of the cationic polymer containing the quaternary ammonium base involves defects fatal to the production of the latex dip-formed article, such as the fact that the latex blended liquid is unstable and the fact that zinc oxide cannot be added.

In view of the foregoing, a method of deactivating the quaternary ammonium base is of importance.

The inventors of the present invention have dissolved 1.0 part of reinforced rosin (trade name FR-1900, manufactured by SEIKO PMC CORPORATION) as an anionic hydrophobic compound and 0.5 part of ammonia (the amount of each component was determined with respect to a latex) in water corresponding to dilution water, and have dropped 10% of each of a polyamide-epichlorohydrin resin (trade name WS4030, manufactured by SEIKO PMC CORPORATION) and a polyamine-epichlorohydrin resin (polyamine epoxy resin) (trade name WS4052, manufactured by SEIKO PMC CORPORATION) to the aqueous solution. As a result, the inventors have found that the liquid, which was originally transparent, became milky during the titration. The equivalence point of the titration at which the liquid became milky was 0.57 part in the case of the WS 4030, or was 0.67 part in the case of the WS 4052.

In view of the foregoing, a transparent liquid was prepared by dropping 0.5 part of the WS 4030 or 0.5 part of the WS 4052 to an aqueous solution containing 1.0 part of the FR-1900 and 0.5 part of ammonia. The amount of each component to be added was such that no milky product was produced. Then, a latex prepared liquid was prepared by adding the prepared liquid to a latex. As a result, the prepared liquid was stably present, and a dip-formed article produced from the liquid had good properties. The addition of ammonia and the WS 4030 or the WS 4052 after the addition of the FR-1900 provided the same result.

Although the reinforced rosin has a carboxyl group, the latex blended liquid is stable as long as the polymer containing the quaternary ammonium base is added in such an amount that the reinforced rosin is stably present. This is probably because a reinforced rosin anion coordinates as the counter ion of a quaternary ammonium cation to block the quaternary ammonium cation.

Therefore, when the quaternary ammonium cation is blocked with an anion, the latex to which the polymer containing the quaternary ammonium base has been added is stably present, and a good dip-formed article is obtained. Thus, a method of deactivating the quaternary ammonium cation was completed.

The amount of the anion to be actually needed and the allowable addition amount of the polymer containing the quaternary ammonium base are desirably measured with a latex addition system.

In addition, the addition of a liquid cationic starch or a cationic polyvinyl alcohol instead of the above polymer provided the same result.

A carbohydrate such as a water-soluble cationic guar gum or a cationic cellulose also has the same effect.

The water resistant additive is desirably added to not only an anionic or nonionic polyvinyl alcohol, a polyacrylamide, or a nonionic or anionic carbohydrate but also an amine group with its cationic property lost, a polyvinyl alcohol containing a quaternary ammonium base, a polyacrylamide, a polyamine-based resin, or a latex blended with a water-soluble carbohydrate. Examples of the water resistant additive include the organometallic crosslinking agent having two or more hydroxyl groups according to the present invention, a polymer having an amine group with its cationic property lost, a polyvalent metal compound such as ammonium zirconium carbonate as a polyvalent metal compound, a glycerol polyglycidyl ether resin having an epoxy group, glyoxal having an aldehyde group, a dialdehyde starch, a urea formaldehyde resin having a methylol group, and a carbonyl adduct of a polyhydric alcohol (Sequarez 755).

The water resistant additive is added in a small amount. The amount is 0.02 part or more, preferably 0.05 part or more, or more preferably 0.1 part or more.

In addition, a cationizing agent for cationizing a raw material latex or a blended composition (such as N-(3-chloro-2-hydroxypropyl)trimethylammonium chloride or 2-3-epoxytrimethylammonium chloride) also functions as a water resistant additive. The cationizing agent, which introduces a quaternary ammonium base into a latex or a blended chemical, is a monovalent cation when blended, so the agent can be easily blended also into an anionic latex raw material.

Further, the addition of the cationizing agent alone without the addition of a polyamide can result in the production of a dip-formed article having durability, creep resistance, water resistance, and water resistance after wearing.

In addition, the above crosslinkable functional group can be introduced into a polyacrylamide, a polyvinyl alcohol, or a water-soluble carbohydrate.

When the above diene-based rubber latex composition having peeling property and water resistance, and, furthermore, expressing a strength is internally added to paper, or the paper is impregnated or coated with the composition, paper having the following characteristics can be produced: insufficient water resistance, cohesiveness, an insufficient strength, and the like originating from a latex or the like are alleviated in the paper, and the paper has blocking resistance, water resistance, and a surface strength allowing the paper to resist dampening water (wet pick resistance or wet friction resistance).

Next, the surface of a dip-formed article gives the user a certain kind of a slimy touch, and the slimy touch becomes remarkable during the use of the molded article. This is probably due to a surfactant used as an emulsifier or a calcium salt of the surfactant. Any such substance bleeds out to the surface of the product during the production or use of the product to impart weak cohesiveness to the surface.

The addition of a water-soluble polymer acting as a protective colloid is effective in preventing the surfactant from bleeding out.

The use of the water-soluble polymer is known to cause a phenomenon referred to as creaming. The occurrence of creaming causes a latex layer and a water layer to be separate from each other. As can be understood from the phenomenon, the addition of the water-soluble polymer to a latex results in the formation of the so-called protective colloid, whereby a latex particle and a free surfactant are isolated from each other, the emission of the surfactant is promoted in a production step for the product such as leaching, and the bleed-out of the surfactant is suppressed. As a result, the so-called slimy touch due to the surfactant or the calcium salt of the surfactant is eliminated, and the cohesiveness of the product is also reduced.

The inventors of the present invention have added a small amount (0.15 part) of ethylhydroxyethylcellulose subjected to a hydrophobic treatment to a latex composition to which an organic aluminum metal-based crosslinking agent was added, and have formed a molded article from the composition. As a result, the surface of the product had a reduced slimy touch, and started to show a refreshing feeling. Further, the peeling property and water resistance of the product were improved, and the sticky feeling of the product was reduced.

In the case of a dip-formed article, the prevention of the adhesion of molded article films is of extreme importance. At present, however, the adhesion has been prevented by, for example, chlorinating or coating the surface of the dip-formed article.

The inventors of the present invention consider that the molded article films adhere to each other owing to a chemical bond such as a hydrogen bond. However, when all carboxyl groups are blocked with a carboxyl group blocking agent, the crosslinking of the molecules of a latex advances excessively, with the result that the latex loses its rubber-like properties. In view of the foregoing, the inventors of the present invention have thought that the films can be prevented from adhering to each other by blocking carboxyl groups on the surface of each molded article film, and, on the basis of the thought, the inventors have proposed a surface treatment for a product with a carboxyl group blocking agent to which an aluminate or an aluminum hydroxide gel was added (JP 3635060 B). However, the treatment has the following drawback: aluminum acts as a trivalent cation, so the product becomes hard, and the addition amount of the aluminate or the aluminum hydroxide gel is restricted. Accordingly, neither the aluminate nor the aluminum hydroxide gel has been able to exert its effect sufficiently in the surface treatment with a carboxyl group blocking agent.

The organometallic crosslinking agent system does not have the drawback, that is, the fact that a product becomes hard, and provides the product with good peeling property even when used alone. Accordingly, the system has been able to realize the impartment of non-cohesiveness to the product in a surface treatment with a cationic carboxyl group blocking agent effectively.

The cohesiveness of a dip-formed article is lower on a mold side where a calcium concentration is high than on a latex side of a film. Therefore, a higher necessity for a surface treatment with a cationic carboxyl group blocking agent arises on the side opposite to a dipping mold side than on the dipping mold side. In view of the foregoing, both surfaces of the dip-formed article can be treated, or a surface treatment for one side of the product can be omitted.

The term "non-cohesiveness of a product" as used herein, which refers to a state where the product passes a heating non-cohesiveness test to be described later, actually refers to a state where the surfaces of products are not joined to each other for a time period of about 6 months from the production of the products to the use of the products.

That is, the present invention is as follows:

[1] A dip-forming composition, comprising:
a carboxyl group-containing diene-based rubber latex; and one or more compounds selected from the following (a) to (e):
- (a) an organometallic crosslinking agent containing two or more hydroxyl groups each bonded to a metal atom;
- (b) a cationic property-deactivated modified polyamine-based resin, a cationic property-deactivated polyamide-epichlorohydrin resin, a cationic property-deactivated polyamine-epichlorohydrin resin, a cationic property-deactivated amine group- or quaternary ammonium base-containing polyvinyl alcohol, a cationic property-deactivated amine group- or quaternary ammonium base-containing polyacrylamide, a cationic property-deactivated amine group- or quaternary ammonium base-containing carbohydrate, or a polyacrylamide, polyvinyl alcohol, or carbohydrate into which a crosslinkable functional group is introduced;
- (c) an anionic or nonionic polyvinyl alcohol, anionic or nonionic polyacrylamide, or anionic or nonionic carbohydrate to which a water resistant additive or water-resistant polymer is added;
- (d) a water resistant polyvinyl alcohol; and
- (e) a cationizing agent.

As the metal atom described in the item [1], there are exemplified aluminum and titanium.

Examples of the water resistant additive include an organometallic crosslinking agent having two or more hydroxyl groups each bonded to a metal atom, a polymer having a cationic property-deactivated primary, secondary, or tertiary amine group, a polyvalent metal compound (such as ammonium zirconium carbonate or potassium zirconium carbonate), glyoxal having an aldehyde group, dialdehyde starch, a urea formaldehyde resin having a methylol group, a melamine formaldehyde resin, a ketone resin, a carbonyl adduct of a polyhydric alcohol, a cationization agent, and a borax.

[2] The dip-forming composition according to item [1], further comprising one or more organic compounds selected from a hydrophobic substance, a hydrophobic group-containing carboxylic acid or a salt of the acid, an aluminum disoap or trisoap of a hydrophobic group-containing carboxylic acid, and a metal soap of a hydrophobic group-containing carboxylic acid.

Examples of the hydrophobic substance described in item [2] include one or more organic compounds selected from waxes, synthesized waxes, polyolefin-based waxes, a low-molecular-weight polyolefin, a low-density polyethylene, olefin-based thermoplastic elastomer, an ethylenevinyl acetate copolymer resin, a petroleum resin, a rosin ester, an alkyl ketene dimer, an alkenyl succinic anhydride, an acryl-based resin, an alkyl methacrylate copolymer resin, a styrene-based resin, and a surface sizing agent. In addition, as the hydrophobic group-containing carboxylic acid and its salts, there are exemplified rosins, a reinforced resin, a disproportionating rosin, a dimer acid, a petroleum resin sizing agent, an alkenyl succinic acid, a tall oil aliphatic acid, a higher fatty acid, a dibasic acid, a polybasic acid, and salts thereof.

[3] The dip-forming composition according to item [1] or [2], further comprising a water-soluble polymer.

Examples of the water-soluble polymer described in item [3] include a tamarind gum, a carageenan, a carboxymethyl cellulose, a methyl cellulose, an ethylhydroxyethyl cellulose, a methyl hydroxypropyl cellulose, a hydrophobic ethylhydroxyethyl cellulose, a polyethylene oxide, an ethylene oxide-propylene oxide random copolymer, a water-soluble polyvinyl acetal, a polyvinyl alcohol, a polyamide, and a polyvinyl alcohol.

[4] The dip-forming composition according to any one of items [1] to [3], further comprising magnesium hydroxide and/or calcium hydroxide;

[5] A dip-formed article which is obtainable by crosslinking and molding the dip-forming composition according to any one of items [1] to [4];

[6] The dip-formed article according to item [5], in which a surface of the crosslinked molded article is treated with a cationic carboxyl group blocking agent and/or an anionic hydrophobic compound.

Examples of the cationic carboxyl group blocking agent and/or anionic hydrophobic compound described in item [6] include a crosslinking agent for a trivalent or more cationic metal ion, a cationic aluminum hydroxide sol, a divalent zirconium compound, a styrene-based surface sizing agent having a quaternary ammonium base, a cationic epichlorohydrin-based resin, a polyamide epoxy resin, a styrene-based surface sizing agent having a quaternary ammonium base, chitosan, a cationic styrene acrylic copolymer-based resin, a cationic styrene acryl emulsion-based resin, a cationic acryl copolymer-based resin, a cationic olefin-maleic acid-based resin, a cationic urethane-based resin, a cationic long-chain alkyl-containing polymer release agent, an anionic styrene-based surface sizing agent, an anionic styrene acryl copolymer-based resin, an anionic styrene acryl emulsion-based resin, an anionic acryl copolymer-based resin, an anionic olefin-maleic acid-based resin, an anionic urethane-based resin, and anionic long-chain alkyl-containing polymer release agent.

[7] An organometallic crosslinking agent for a diene-based rubber latex comprising one or more organometallic compounds each having a structure selected from the following formulae (1), (2), (3), (4), and (5):

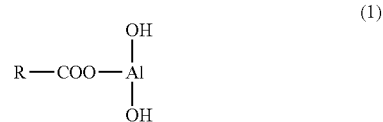

R represents a saturated or unsaturated aliphatic group, or an aromatic group;

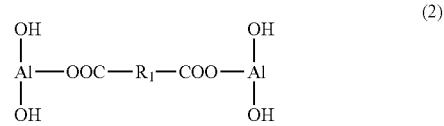

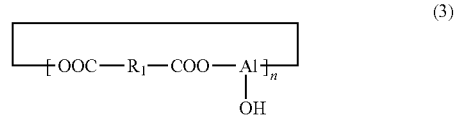

n represents an integer of 2 or more, and $R_1$ represents a saturated or unsaturated divalent aliphatic group, or a divalent aromatic group;

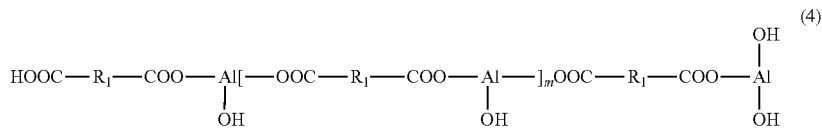

m represents 0, or an integer of 1 or more, and $R_1$ represents a saturated or unsaturated divalent aliphatic group, or a divalent aromatic group;

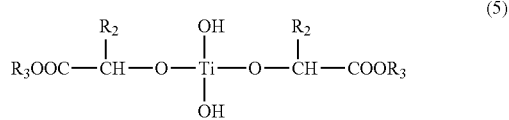

$R_2$ represents a saturated or unsaturated aliphatic group, and $R_3$ represents a hydrogen atom, or a saturated or unsaturated aliphatic group.

[8] A carboxyl group-containing diene-based rubber latex composition, comprising:
a carboxyl group-containing diene-based rubber latex; and the organometallic crosslinking agent according to [7].

[9] A crosslinked molded article obtained by crosslinking and molding the carboxyl group-containing diene-based rubber latex composition according to [8].

[10] The crosslinked molded article according to [9], wherein a surface of the crosslinked molded article is treated with a cationic carboxyl group blocking agent and/or an anionic hydrophobic compound.

The present invention provides a novel carboxyl group crosslinking agent capable of imparting characteristics comparable to those imparted by sulfur vulcanization.

The utilization of a latex composition containing the crosslinking agent can result in a hypoallergenic dip-formed article free of sulfur and a vulcanization accelerator, and the article can be utilized in a wide variety of fields including a medical field, a food field, and an electronic part field. In addition, the article can exploit new applications such as a paper coating field.

DESCRIPTION OF THE PREFERRED EMBODIMENTS

Hereinafter, the present invention will be described in detail.

A rubber latex to be utilized in the present invention is a carboxyl group-containing diene-based latex.

Examples of the carboxyl group-containing diene-based rubber latex include a carboxyl-modified NBR, a carboxyl-modified SBR, and a carboxyl-modified MBR. A diene-based rubber latex obtained by the emulsion polymerization of 0.1 to 20 wt % of an ethylenic unsaturated carboxylic acid-based monomer, 30 to 80 wt % of a conjugated diene-based monomer, and 10 to 69.5 wt % of any other ethylenic unsaturated monomer capable of copolymerizing with these monomers is particularly preferable.

Here, as the ethylenic unsaturated carboxyl acid-based monomer, acrylic acid, methacrylic acid, crotonic acid, fumaric acid, itaconic acid, and maleic acid are exemplified. One or two or more kinds of them may be used. Particularly, methacrylic acid is preferred.

In addition, as the conjugate diene-based monomer, 1,3-butadiene, 2-methyl-1,3-butadiene, 2,3-dimethyl-1,3-butadiene are exemplified. One or two or more kinds of them may be used. Particularly, 1,3-butadiene is preferred.

Further, examples of other copolymerizable ethylenic unsaturated monomers include vinyl cyanide-based monomers such as methacrylonitrile, α-chloracrylonitrile, and α-ethylacrylonitrile, aromatic vinyl-based monomers such as styrene and α-methyl styrene, unsaturated alkyl carboxylate-based monomers such as methyl acrylate, ethyl acrylate, butyl acrylate, 2-hydroxyethyl acrylate, methyl methacrylate, 2-hydroxyethyl methacrylate, and glycidyl methacrylate, ethylenic unsaturated carboxylamide-based monomers such as acrylamide, methacryloamide, N,N-dimethylacrylamide, and N-methylol acrylamide, ethylenic unsaturated amine-based monomers such as methylaminoethyl (meth)acrylate, dimethylaminoethyl (meth)acrylate, and 2-vinyl pyridine, and vinyl carboxylates such as vinyl acetate. One or two or more kinds of them may be used.

An organometallic crosslinking agent containing two or more hydroxyl groups each bonded to a metal atom is, for example, a compound containing two or more hydroxyl groups each bonded to an aluminum atom, or a compound containing two or more hydroxyl groups each bonded to a titanium atom.

The crosslinking agent is preferably, for example, a compound having such a structure that an aluminum atom is bonded to the carboxyl group of a carboxylic acid and two or more hydroxyl groups are bonded to the aluminum atom.

Such compound is, for example, a compound having a dihydroxyaluminum structure in which two hydroxyl groups are attached to an aluminum atom bonded to the carboxyl group of a carboxylic acid as shown below. The two hydroxyl groups crosslink the carboxyl groups of a polymer. Therefore, as in the case of sulfur, the compound is a divalent crosslinking agent.

(Chemical structure 1)

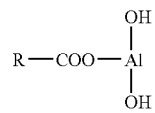

(R represents a saturated or unsaturated aliphatic group, or an aromatic group.)

The above dihydroxyaluminum organic compound is generally obtained in the form of a dihydroxyaluminum salt of a carboxylic acid, but is not limited to the salt. The kind of the carboxylic acid is not restricted. For example, an aliphatic carboxylic acid, an aromatic carboxylic acid, and an alicyclic carboxylic acid can each be used. A carboxylic acid having a substituent such as an amino group or a hydroxyl group is also permitted.

Specific examples include dihydroxyaluminum octylate (C8), dihydroxyaluminum octanate (C8), dihydroxyaluminum caprate (C10), and dihydroxyaluminum naphthenate. A dihydroxyaluminum salt having a carboxylic acid containing a functional group such as an amino group or hydroxyl group may also be used as the crosslinking agent of the present invention. Specific examples include glycine dihydroxyaluminum and lysine dihydroxyaluminum.

It should be noted that the metal crosslinking agent is known to be present in a state where the molecules of the agent polymerize with each other. For example, dihydroxyaluminum lactate is credited with being a pentamer in a solid state. Such polymer is also included in the organometallic crosslinking agent of the present invention.

The compound of the present invention is expected to have high safety. For example, glycine dihydroxyaluminum or dihydroxyaluminum acetylsalicylate described above is used as an antacid in a medicine.

Another example of the organometallic crosslinking agent containing two or more hydroxyl groups each bonded to an aluminum atom is a compound having a dihydroxyaluminum structure in which an aluminum atom is bonded to each of the two carboxyl groups of a dibasic carboxylic acid, and two hydroxyl groups are bonded to each of the aluminum atoms.

Two dihydroxyaluminum structures (corresponding to the monosoap of a carboxylic acid) may be present in a dibasic carboxylic acid (chemical structure 2).

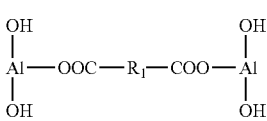
(Chemical structure 2)

The compound also functions as a crosslinking agent for carboxyl groups, and the results of the following experiment confirmed that the compound had an improving effect on the tensile strength of a crosslinked molded article such as dip formed article and paper.

In the case of a polybasic carboxylic acid, multiple dihydroxyaluminum structures corresponding to the polybasicity of the acid are produced.

The synthesis of an aluminum carboxylate having the two dihydroxyaluminum structures of a dibasic carboxylic acid requires a theoretical amount of 2 moles of a water-soluble aluminum salt per 1 mole of the dibasic carboxylic acid.

However, when only 1 mole of the water-soluble aluminum salt per 1 mole of the dibasic carboxylic acid is added, compounds having the following chemical structure 3 and/or the following chemical structure 4 (polymers each using, as a repeating unit, a structure in which an aluminum atom is bonded to one carboxyl group of the dibasic carboxylic acid, and one hydroxyl group is bonded to the aluminum atom) are produced. Each of the compounds is expected to have a function of crosslinking carboxyl groups because each of the compounds has two or more hydroxyl groups each bonded to an aluminum atom.

Cyclic Polymer

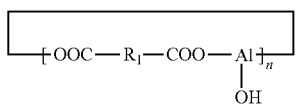
(Chemical structure 3)

(n represents an integer of 2 or more.)
Chain polymer (two hydroxyl groups are bonded to a terminal aluminum atom)

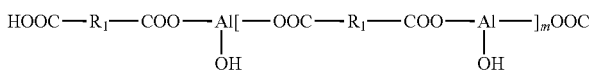
(Chemical structure 4)

(m represents 0, or an integer of 1 or more.)
When 1 to 2 moles of the water-soluble aluminum salt are added in a dibasic acid salt, a mixture of compounds having the chemical structures 2, 3, and 4 may be produced.

In each of the chemical structures 2 to 4, $R_1$ represents a saturated or unsaturated divalent aliphatic group, or a divalent aromatic group.

The kind of the dibasic carboxylic acid is not restricted. For example, an aliphatic carboxylic acid, an aromatic carboxylic acid, and an alicyclic carboxylic acid can each be used. A carboxylic acid having a substituent such as an amino group or a hydroxyl group is also permitted. Specific examples of the dibasic carboxylic acid include adipic acid, 2,4-diethylglutaric acid, azelaic acid, and sebacic acid. A C12, C20, or C22 dicarboxylic acid manufactured by OKAMURA OIL MILL, LTD., or a C21 dicarboxylic acid manufactured by Westvaco is known as a higher dibasic acid. In addition, a dimer acid (C36 dibasic acid) is synthesized from a tall oil aliphatic acid or a soybean oil aliphatic acid.

Such organometallic crosslinking agent containing two or more hydroxyl groups each bonded to an aluminum atom as described above is obtained by, for example, adding a hydroxide such as sodium hydroxide or potassium hydroxide to a carboxylic acid to prepare an aqueous solution of a carboxylate such as sodium carboxylate or potassium carboxylate and causing aluminum nitrate to react with the solution.

Examples of the compound containing two or more hydroxyl groups each bonded to a titanium atom include a dihydroxybis(hydroxycarboxylate)titanium and an ester of the dihydroxybis(hydroxycarboxylate)titanium.

The dihydroxybis(hydroxycarboxylate)titanium can be synthesized in accordance with Example 1 of JP-A-2000-351787. For example, dihydroxybis(hydroxyisobutyrate)titanium is obtained by: dissolving α-hydroxyisobutyric acid in isopropanol; slowly dropping isopropoxy titanium corresponding to a molar ratio of 2:1 to the solution; continuing the stirring of the mixture at room temperature after the completion of the dropping until the mixture is turned into a white suspension; and removing isopropanol by distillation with a rotary evaporator.

In the same way, appropriate dihydroxybis (hydroxy carboxylate) titanium may be synthesized from hydroxy carboxylic acids such as glycol acid, lactic acid, α-hydroxybutyrate, α-hydroxyisobutyrate, β-hydroxy propionate, β-hydroxy butyrate, β-hydroxy isobutyrate, γ-hydroxy butyrate, glyceric acid, tartoronic acid, malic acid, tartaric acid, meso tartaric acid, and citric acid.

As shown in the following chemical structure 5 ($R_2$=$CH_3$, $R_3$=H), dihydroxytitanium lactate has two hydroxyl groups each bonded to a titanium metal atom. When the compound was added to a carboxylated diene-based rubber latex after the addition of ammonia to the latex, the latex was stably present for a long time period, and served as a crosslinking agent having an effect similar to that of the above aluminum metal compound.

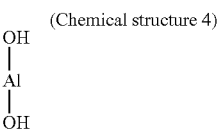

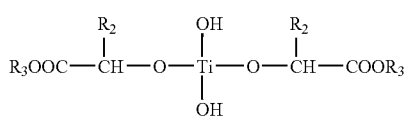
(Chemical structure 5)

$R_2$ represents a saturated or unsaturated aliphatic group, and $R_3$ represents a hydrogen atom, or a saturated or unsaturated aliphatic group.

It should be noted that hydrophobicity is desirably imparted to an organic aluminum crosslinking agent in order that water resistance and peeling property may be imparted to a crosslinked article obtained by using the crosslinking agent.

A sizing agent used in paper has been attracting attention because of its potential to serve as the carboxylic acid raw material.

A usable sizing agent is, for example, rosin mainly composed of abietic acid or an isomer of the acid, hydrogenated rosin, disproportionated rosin, or reinforced rosin obtained by maleating or fumarating rosin.

In addition, alkenyl succinic acids each known as a synthetic sizing agent have been used as surfactants or synthetic sizing agents, and each of these succinates is produced by adding maleic anhydride to a C12, C16, or C18 olefin oligomer and hydrolyzing the resultant with an alkali. These succinates are each a dicarboxylic acid.

An organic aluminum metal compound of the above sizing agent having any one of the chemical structures 1 to 4 such as dihydroxyaluminum rosinate or an alkenyl succinic acid-based aluminum compound can also be used as the crosslinking agent of the present invention.

A composition of the present invention contains a carboxyl group-containing diene-based rubber latex and the above organometallic crosslinking agent.

The addition amount of the organometallic crosslinking agent cannot be uniquely determined because the molecular weight of the crosslinking agent covers a broad range, but the addition amount is preferably 0.3 part to 2 parts, or more preferably 0.5 part to 1.5 parts with respect to 100 parts by weight of the latex.

When the organometallic crosslinking agent is acidic, the pH of the carboxyl group-containing diene-based rubber latex composition is preferably adjusted to fall within an alkaline region, or more preferably adjusted to 9 to 10 with ammonia or the like in order that the stability of the composition may be improved.

Next, the inventors of the present invention have proposed that hydrophobicity be imparted to a crosslinked molded article by adding one or two or more organic Compounds selected from a hydrophobic substance, a hydrophobic group-containing carboxylic acid or a salt of the acid, an aluminum disoap or trisoap of a hydrophobic group-containing carboxylic acid, and a metal soap of a hydrophobic group-containing carboxylic acid to a carboxyl group-containing diene-based rubber latex instead of imparting hydrophobicity to a crosslinking agent. Such action enabled the inventors to impart water resistance and peeling property to a crosslinked article even when a water-soluble organometallic crosslinking agent was used.

That is, the carboxyl group-containing diene-based rubber latex composition of the present invention may further contain one or two or more organic compounds selected from a hydrophobic substance, a hydrophobic group-containing carboxylic acid or a salt of the acid, an aluminum disoap or trisoap of a hydrophobic group-containing carboxylic acid, and a metal soap of a hydrophobic group-containing carboxylic acid.

The addition amount of the hydrophobic substance, the hydrophobic group-containing carboxylic acid or the salt of the acid, the aluminum disoap or trisoap of a hydrophobic group-containing carboxylic acid, or the metal soap of a hydrophobic group-containing carboxylic acid, which is not particularly limited, is preferably 0.5 to 2.0 parts by weight, or more preferably 0.5 to 1.0 part by weight with respect to 100 parts by weight of the latex.

Examples of the hydrophobic substance include waxes, synthesized waxes, polyolefin-based waxes, a low-molecular-weight polyolefin, a low-density polyethylene, an olefin-based thermoplastic elastomer, an ethylene vinyl acetate copolymer resin, a petroleum resin, rosin esters, an alkyl ketene dimer, an alkenyl succinic anhydride, an acryl-based resin, an alkyl methacrylate copolymer resin, and a styrene-based resin.

Examples of the hydrophobic group-containing carboxylic acid and its salts include rosins, a reinforced rosin, a disproportionating rosin, a dimer acid, a petroleum resin sizing agent, an alkenyl succinic acid, a tall oil aliphatic acid, a higher fatty acid, a dibasic acid, a polybasic acid, and salts thereof. The addition of the hydrophobic group-containing carboxylic acid as a water-soluble salt is effective, but the acid can be added as it is when the acid is emulsified like a rosin ester.

In addition, the aluminum disoaps of carboxylic acids, and various metal soaps of hydrophobic group-containing carboxylic acids each impart water resistance and peeling property to the crosslinked molded article, thereby contributing to the impartment of non-cohesiveness to a product.

It should be noted that a water-soluble dihydroxyaluminum organometallic compound having low hydrophobicity (such as dihydroxyaluminum lactate), a low-molecular-weight dihydroxyaluminum organometallic compound (such as tetrahydroxyaluminum adipate), or the like can be used as the organometallic crosslinking agent when such hydrophobic compounds as described above are separately added to the carboxyl group-containing diene-based rubber latex.

The carboxyl group-containing diene-based rubber latex composition of the present invention may further contain a water-soluble polymer in order that the surface of a dip-formed article may be prevented from having slime.

Examples of water-soluble polymer include natural polymers such as a tamarind gum and a carageenan, semisynthetic polymers such as a carboxymethyl cellulose, a methyl cellulose, an ethylhydroxyethyl cellulose, a methyl hydroxypropyl cellulose, and a hydrophobic ethylhydroxyethyl cellulose, synthetic polymers such as a polyethylene oxide, an ethylene oxide-propylene oxide random copolymer, a water-soluble polyvinyl acetal, and a polyvinyl alcohol. A water-soluble polymer not causing creaming is also effective.

However, the degree of polymerization, addition amount, latex concentration, and the like of the water-soluble polymer must be selected in such a manner that the viscosity of the composition is 40 cps or less because the addition of the polymer increases the viscosity of the composition.

In addition, these parameters are preferably selected to such an extent that the physical properties of a product are lowly affected because a molecule of the water-soluble polymer is stiffer than that of a latex raw material in many cases.

In the experiment, a tamarind gum, a carageenan, a carboxymethyl cellulose, a methyl cellulose, an ethylhydroxyethyl cellulose, a methyl hydroxypropyl cellulose, a hydrophobic ethylhydroxyethyl cellulose, a polyethylene oxide, an ethylene oxide-propylene oxide random copolymer, a water-soluble polyvinyl acetal, and a polyvinyl alcohol were favorable, but a favorable water-soluble polymer is different depending on the quality of latex material.

The addition amount of the water-soluble polymer, which is not particularly limited, is preferably 0.05 to 0.25 part by weight, or more preferably 0.1 to 0.2 part by weight with respect to 100 parts by weight of the latex.

The carboxyl group-containing diene-based rubber latex composition of the present invention may further contain colloidal magnesium hydroxide and/or calcium hydroxide.

Colloidal magnesium hydroxide can be produced in the form of magnesium hydroxide in coexistence with sodium hydroxide and/or potassium hydroxide by causing a water-soluble magnesium salt and a strong alkali such as potassium hydroxide or sodium hydroxide to react with each other. The salt may be added to the alkali, or the alkali may be added to the salt, but the salt and the alkali are desirably caused to react with each other in such a manner that the concentration of each of the salt and the alkali in the mixture is as low as possible, and the mixture has as high a pH as possible. In actuality, colloidal magnesium hydroxide is preferably added to a raw material latex in such a manner that a latex concentration is about 30% or less, and the pH of the composition is about 9.2 to 9.8. These values vary depending on the properties of the raw material latex such as the carboxyl group content of the latex, the amount of carboxyl groups present on the surface of a particle of the latex, and the degree of stability of the latex. The addition amount of colloidal magnesium hydroxide, which also varies depending on the properties of the latex, is preferably about 0.2 to 0.5 part in terms of MgO.

In addition, a magnesium hydroxide suspension prepared in the same manner as in the preparation of dispersed calcium hydroxide described below can be used instead of colloidal magnesium hydroxide.

Calcium hydroxide can be produced so as to be in coexistence with sodium hydroxide and/or potassium hydroxide by causing a water-soluble calcium salt and a strong alkali such as potassium hydroxide or sodium hydroxide to react with each other as in the case of colloidal magnesium hydroxide.

Further, calcium hydroxide having an effect similar to that of colloidal magnesium hydroxide can be prepared by: slaking quick lime; adding potassium hydroxide or sodium hydroxide to calcium hydroxide produced; and dispersing the mixture with a dispersing machine. The addition amount of calcium hydroxide is comparable to that in the case of colloidal magnesium hydroxide in terms of a molar equivalent.

When the above organic aluminum metal compound- or organic titanium metal compound-based carboxyl group crosslinking agent having such a structure that two hydroxyl groups are each bonded to an aluminum atom is added to the carboxyl group-containing diene-based rubber latex, the agent is considered to form a pendant half ester bond with a carboxyl group present in the polymer chain of the composition as in the case of zinc oxide; the blended composition was stably present for 6 months without producing the so-called creeping and blobbing. Therefore, the composition can be prepared by a raw material manufacturer, and can be sold to the user.

It should be noted that an age inhibitor, an antiseptic, a dispersant, a thickener, or the like can be appropriately added to the above composition as required.

The carboxyl group-containing diene-based rubber latex composition of the present invention may contain one or more compounds selected from (b) a cationic property-deactivated, modified polyamine-based resin, a cationic property-deactivated polyamide-epichlorohydrin resin, a cationic property-deactivated polyamine-epichlorohydrin resin, a cationic property-deactivated amine group- or quaternary ammonium base-containing polyvinyl alcohol, a cationic property-deactivated amine group- or quaternary ammonium base-containing polyacrylamide, a cationic property-deactivated amine group- or quaternary ammonium base-containing carbohydrate, or a polyacrylamide, polyvinyl alcohol, or carbohydrate into which a crosslinkable functional group is introduced; (c) an anionic or nonionic polyvinyl alcohol, anionic or nonionic polyacrylamide, or anionic or nonionic carbohydrate to which a water resistant additive or water resistant polymer is added; (d) a water resistant polyvinyl alcohol; and (e) a cationizing agent instead of, or together with, the above organometallic crosslinking agent.

The carboxyl group-containing diene-based rubber latex composition of the present invention may further contain one or more compounds selected from the above compounds (b), (c), (d), and (e), and a hydrophobic substance.

The addition amount of each of the compounds (b), (c), (d), and (e), which is not particularly limited, is preferably 0.03 to 2.0 parts by weight, or more preferably 0.1 to 1.0 part by weight with respect to 100 parts by weight of the latex.

A polyvinyl alcohol is basically produced by polymerizing and saponifying a vinyl acetate monomer in methanol. In addition, as in the case of a polyamide system, a carboxylated or cationized product has been produced. In addition, a silicon-containing modified product is obtained by the copolymerization of a silicon-containing vinyl monomer and vinyl acetate.

The polyacrylamide may be obtained by polymerizing acrylamides.

The anionic polyacrylamide may be obtained by hydrolyzing polyacrylamide with alkali or copolymerizing an acrylamide and a methacrylic acid.

Each cationic and amphoteric polyacrylamides may be obtained as a copolymer of a Mannich-modified substance, a Hofmann-decomposed substance, and a cationic monomer.

The composition of the present invention may contain zinc oxide. The addition of zinc oxide, which varies depending on the kind of the latex, is preferably 0.7 to 2.0 parts by weight, or more preferably 1.0 to 1.5 parts by weight with respect to 100 parts by weight of the latex.

It should be noted that, when the composition according to the present invention is used as a dip-forming composition, the dip-forming composition is preferably substantially free of a sulfur-containing vulcanizer and a vulcanization accelerator, and, furthermore, is particularly preferably completely free of these substances. Specifically, each of the substances is preferably used in an amount of 0.2 part by weight or less with respect to 100 parts by weight of the diene-based rubber latex (solid content).

In addition, the dip-forming composition of the present invention may include, as required, rubber latecies such as a natural rubber latex and an isoprene rubber latex, pH adjusters such as potassium hydroxide, sodium hydroxide, and ammonium solution, fillers such as titanium dioxide, phthalic anhydride, benzoic acid, salicylic acid, and magnesium carbonate, antioxidants such as styrenated phenol, imidazoles, and p-phenylene diamine, and colorants such as fast yellow, phthalocyan blue, and ultramarine.

It should be noted that the order in which the above respective components are added for obtaining the composition of the present invention and the time at which each component is added are not particularly limited, and the respective components may be simultaneously added, or a method involving adding some of the components and adding the remaining components some time period after the addition may be adopted.

Any one of the conventionally known dip forming methods such as a direct dipping method, an anode coagulant dipping method, and a Teague dipping method is applicable to the formation of a dip-formed article from the above dip-forming composition. The shape of the dip-formed article, which is not particularly limited, is, for example, a glove shape. The crosslinking of the carboxyl groups of the carboxyl group-containing diene-based rubber latex with the organometallic crosslinking agent is achieved by heating the composition after dip forming at preferably 100 to 150° C. That is, a crosslinked dip-formed article of the present invention can be produced by mixing the above respective components to provide the composition and heating the composition.

Hereinafter, the anode coagulant dipping method will be briefly described. First, a mold is dipped into a coagulant liquid, and is lifted and dried so that the coagulant of the liquid adheres to the surface of the mold. The coagulant liquid is prepared by dissolving a calcium salt such as calcium chloride, calcium nitrate, or calcium acetate in water, or a hydrophilic organic solvent such as an alcohol or a ketone. A calcium concentration in the coagulant liquid is typically 5 to 50 wt %, or preferably 10 to 30 wt %. The coagulant liquid may be blended with a surfactant such as a nonionic or anionic surfactant, or a filler such as calcium carbonate, talc, or silica gel as required. Then, the mold to which the coagulant has adhered is dipped into a copolymer latex composition for dip forming, and is lifted. At this time, the coagulant and a copolymer latex react with each other to form a rubber-like coating film on the mold. The resultant coating film is washed with water, dried, and peeled from the mold, whereby a dip-formed article is obtained.

It should be noted that the surface of the crosslinked molded article of the carboxyl group-containing diene-based rubber latex composition may be treated in order that molded article films each composed of the molded article may be prevented from adhering to each other. A non-cohesive surface treatment agent to be used in the surface treatment is preferably a cationic carboxyl group blocking agent, and an inorganic compound such as a cationic metal ion crosslinking agent which is trivalent or more (for example, a polyaluminum hydroxide salt, a water-soluble aluminum salt, or a water-soluble titanium compound) or a cationic aluminum hydroxide sol (alumina sol) is also an effective surface treatment agent, but in the present invention, a divalent zirconium compound also makes the surface of the composition non-cohesive, and this is probably because an effect of the organic aluminum metal crosslinking agent of the present invention is large.

As the organic surface treatment agent, a cationic petroleum resin and a cationic alkyl ketene dimer are effective.

As the organic polymer-based surface treatment agent, a styrene-based surface sizing agent having a quaternary ammonium base, a cationic epichlorohydrin-based resin (a polyamide-epichlorohydrin resin, a polyamide amine-epichlorohydrin resin, a polyamine-epichlorohydrin resin, and a polyamide urea formaldehyde resin or the like), a polyamide epoxy resin, a styrene-based surface sizing agent having a chitosan quaternary ammonium base, and a cationic polymer such as chitosan are effective.

In addition, cationic polymers used for a surface sizing agent or the like, such as a cationic styrene acryl copolymer-based resin, a cationic styrene acryl emulsion-based resin, a cationic acryl copolymer-based resin, a cationic olefin-maleic acid-based resin, a cationic urethane-based resin, and a cationic long-chain alkyl-containing polymer release agent, function as carboxyl group release agent as well as a carboxyl group blocking agent.

Further, anionic polymers such as an anionic styrene acryl copolymer-based resin, an anionic styrene acryl-based resin, an anionic acryl copolymer-based resin, an anionic olefin-maleic acid-based resin, an anionic urethane-based resin, and an anionic long-chain alkyl-containing polymer release agent are hydrophobic substances, and function as a non-cohesive agent and a release agent. In addition, a rosin, a rosin emulsion, an esterified rosin emulsion, an alkenyl succinic acid, an alkyl ketene dimer and the like have a non-cohesive effect.

The concentration at which the surface treatment agent is used is not particularly limited, but for example, a solution containing the surface treatment agent at a concentration of 0.1 to 2.0%, or preferably 0.2 to 1.0% can be used.

It should be noted that both surfaces of the crosslinked molded article are preferably treated.

A dip-formed article produced by using a composition, which was obtained by adding the above organometallic crosslinking agent to the above carboxyl group-containing diene-based rubber latex, alone or by using a composition obtained by further adding a hydrophobic substance, a hydrophilic polymer, magnesium hydroxide or calcium hydroxide, or zinc oxide to the composition in accordance with an ordinary method had extremely high durability. Of special note is as follows: a wearing test for the dip-formed article confirmed that the article was excellent in creep resistance and water resistance as in the case of a sulfur-vulcanized product.

On the other hand, a dip-formed article blended with only zinc oxide elongated within a short time period, and, furthermore, its water resistance reduced owing to sweat, with the result that the product whitened.

As is apparent from these facts, the carboxyl group crosslinking agent according to the present invention can replace a sulfur-containing vulcanizer. Further, an outstanding feature of the dip-formed article according to the present invention lies in the fact that the viscosity of the product is significantly reduced.

In addition, the dip-formed article thus produced is hypoallergenic because the article is substantially free of sulfur and a vulcanization accelerator. Further, a product substantially free of zinc as a heavy metal can also be produced, so a dip-formed article that can be used in a wide variety of fields including a medical field, a food field, and an electronic part production field can be produced.

EXAMPLES

Hereinafter, the present invention will be described more specifically by way of examples. However, the present invention is not limited to these examples without departing from the gist of the present invention. It should be noted that the terms "part(s)" and "%" each representing a ratio in the examples refer to "part(s) by weight" and "wt %", respectively unless otherwise stated.

Hereinafter, methods of synthesizing crosslinking agents used in the description will be described. It should be noted that the synthesis methods and the crosslinking agents are merely examples, and the present invention is not limited to the synthesis methods and the crosslinking agents.

Synthesis of Novel Crosslinking Agent

Hereinafter, methods of synthesizing novel crosslinking agents used in the description will be described. It should be noted that the synthesis methods and the crosslinking agents are merely examples, and the present invention is not limited to the synthesis methods and the crosslinking agents.

1. Synthesis of Dihydroxyaluminum Octylate

Octylic acid as a reagent is dissolved in sodium hydroxide so that a 5% aqueous solution of sodium octylate is prepared. Then, the solution is previously heated to 65° C.

Aluminum nitrate corresponding to 1.05 moles with respect to 1 mole of sodium octylate is separately weighed, and an aqueous solution of aluminum nitrate is prepared. The amount of the aqueous solution is adjusted in such a manner that the theoretical amount of dihydroxyaluminum octylate to be produced is 1%. The aqueous solution of aluminum nitrate is also previously heated to 65° C.

The 5% aqueous solution of sodium octylate is slowly dropped to the above aqueous solution of aluminum nitrate while the above aqueous solution is stirred. After the dropping, the mixture is continuously stirred at 65° C. for 1 hour. A suspension in which dihydroxyaluminum octylate has been produced is left at rest. On the next day, the supernatant is removed, and the remainder is filtrated. The resultant is washed with water to such an extent that aluminum nitrate does not remain. The washed product is replaced and washed with ethyl alcohol, and is then dried with air, whereby a product is obtained. The measured aluminum content of the product is 13.4%, which substantially corresponds to the theoretical aluminum content (13.2%). Therefore, the substance is a monosoap of a carboxylic acid.

2. Synthesis of Dihydroxyaluminum Rosinate

A 5% aqueous solution of potassium rosinate was prepared and dihydroxyaluminum rosinate was synthesized in the same manner as in the above section 1. The substance is a monosoap of rosin acid, and corresponds to the chemical structure 1.

3. Synthesis of Sebacic Acid-Based Aluminum Metal Compound (1) A 5% aqueous solution of sodium sebacate (SA-NA) is prepared by using a dibasic carboxylic acid manufactured by Honen Seiyu Co., Ltd., and is previously heated to 65° C.

Aluminum nitrate corresponding to 2.05 moles with respect to 1 mole of sodium sebacate is weighed. An aqueous solution of aluminum nitrate is prepared in the same manner as that described above, and is previously heated to 65° C.

The 5% aqueous solution of sodium sebacate is slowly dropped to the above aqueous solution of aluminum nitrate while the above aqueous solution is stirred. After the dropping, the mixture is continuously stirred at 65° C. for 1 hour. After that, the same procedure as that described above is adopted, whereby a tetrahydroxyaluminum sebacate powder (aluminum sebacate soap (1)) having two dihydroxyaluminum structures corresponding to the chemical structure 2 is obtained. The substance corresponds to a monosoap of a dibasic carboxylic acid, and corresponds to the chemical structure 2.

(2) An aluminum sebacate soap (aluminum sebacate soap (II)) is synthesized in the same manner as that described in the item (1) except that a 5% aqueous solution of aluminum nitrate corresponding to a half amount of that described above, that is, 1.025 moles with respect to 1 mole of sodium sebacate is added to the aqueous solution of sodium sebacate. It should be noted that the concentration of sodium sebacate is adjusted in such a manner that the theoretical aluminum soap concentration is 1%.

The aluminum soap (aluminum sebacate soap (II)) contains aluminum nitrate added in an amount half of that of the item (1), corresponds to a disoap of aluminum sebacate, and may have the chemical structure 3 and/or the chemical structure 4. In any case, the soap has two or more hydroxyl groups each bonded to an aluminum atom.

(3) An aluminum sebacate soap (a mixture of the aluminum sebacate soap (I) and the aluminum sebacate soap (II), in other words, an aluminum sebacate soap (III)) is synthesized in the same manner as that described in the item (1) except that a 5% aqueous solution of aluminum nitrate corresponding to 1.525 moles with respect to 1 mole of sodium sebacate is added to the solution of sodium sebacate. It should be noted that the concentration of sodium sebacate is adjusted in such a manner that the theoretical aluminum soap concentration is 1%.

The aluminum soap (aluminum sebacate soap (III)) contains aluminum nitrate added in an amount intermediate between those of the items (1) and (2), and may be a mixture of compounds having the chemical structures 2, 3, and 4.

4. Synthesis of Aluminum Compound Based on Dibasic Acid DIACID (Reaction Product of Tall Oil Aliphatic Acid and Acrylic Acid, DIACID-1550, Manufactured by Harima Chemicals, Inc.)

A 5% aqueous solution was prepared by dissolving a dibasic carboxylic acid DIACID manufactured by Harima Chemicals, Inc. (reaction product of a tall oil aliphatic acid and acrylic acid) in a potassium hydroxide solution.

Hereinafter, a DIACID tetrahydroxyaluminum soap having two dihydroxyaluminum structures corresponding to the chemical structure 2 is obtained in the same manner as in the above item (1) of the section 3. The substance corresponds to a monosoap of a dibasic acid.

5. Synthesis of Alkenyl Succinic Acid-Based Aluminum Compound

An alkenyl succinic anhydride manufactured by SEIKO PMC CORPORATION (GS-L, C12 ASA) is loaded in three equal portions into an aqueous solution of potassium hydroxide in an amount equal to that of the alkenyl succinic anhydride, whereby the alkenyl succinic anhydride hydrolyzes while generating heat. Finally, a 20% solution of a potassium alkenyl succinate is prepared. The solution of the C12 potassium alkenyl succinate is diluted to 5%, and is adjusted to 65° C.

A C12 aluminum alkenyl succinic acid soap is synthesized in the same manner as that described in the item (3) of the section 3 except that a 5% aqueous solution of aluminum nitrate corresponding to 1.525 moles with respect to 1 mole of the C12 potassium alkenyl succinate is added to the solution of the C12 potassium alkenyl succinate.

The aluminum soap contains aluminum nitrate added in an amount corresponding to 1.5 moles with respect to 1 mole of a dibasic acid, and may contain a mixture of compounds corresponding to the chemical structures 2, 3, and 4.

6. Synthesis of Adipic Acid-Based Aluminum Compound

A 5% potassium adipate solution is prepared by adding adipic acid as a reagent to an aqueous solution of potassium hydroxide in an amount equal to that of the reagent. Potassium hydroxide is further added to the potassium adipate solution in such an amount that potassium hydroxide is capable of neutralizing nitric acid to be produced by a reaction, and the mixture is heated to 50° C.

An aqueous solution of aluminum nitrate diluted with water corresponding to 2.05 moles with respect to 1 mole of potassium adipate is slowly dropped to the potassium adipate solution to which potassium hydroxide has been added while the potassium adipate solution is stirred. The mixture is continuously subjected to a reaction while being stirred at 50° C. for 1 hour. After the reaction, the pH of the resultant is adjusted to 5.5 with potassium hydroxide, and an aluminum compound having two dihydroxyaluminum structures (tetrahydroxyaluminum adipate) is separated with a centrifugal separator. It should be noted that the concentration of potassium adipate is adjusted in such a manner that the theoretical aluminum soap concentration is 1%.

The aluminum soap contains aluminum nitrate added in an amount of 2 moles with respect to 1 mole of a dibasic acid, and may have two structures each having two hydroxyl groups each bonded to an aluminum atom corresponding to the chemical structure 2.

7. Dihydroxybis(hydroxyisobutyrate)titanium was Synthesized in Accordance with Example 1 of JP-A-2000-351787.

Glycine dihydroxyaluminum was obtained from Kyowa Chemical Industry Co., Ltd. (GLYCINAL).

Dihydroxytitanium lactate was obtained from Matsumoto Seiyaku Kogyo Co., Ltd. (Orgatix TC-310). Dihydroxyaluminum lactate was obtained from TAKI CHEMICAL CO., LTD. (M-160P).

(1) Production of Carboxyl Group-Containing Latex Composition

Although various carboxyl group-containing diene-based synthetic rubber latices were available, a carboxyl-modified NBR as a representative example of the latices was used in this example. It is taken for granted that the present invention is not limited to the carboxyl-modified NBR.

An NK-223 manufactured by NIPPON A & L INC. was used as the carboxyl-modified NBR. The physical properties of the NK-223 will be described below.

| Solid content | 44 to 46% |
|---|---|
| pH | 8.8 to 9.5 |
| Viscosity/mPa · s | a maximum of 300 |
| Particle diameter/nm | 100 to 150 |
| Specific gravity | about 1 |
| Tg/° C. | −25 |
| Amount of bonded acrylonitrile/% | 28 |
| Amount of methacrylic acid/% | 6 |
| Emulsification system | anionic |

Preparation of Colloidal Magnesium Hydroxide or the Like

A 5% solution of magnesium chloride hexahydrate is prepared, and is added at normal temperature to a potassium hydroxide solution while the potassium hydroxide solution is stirred. The amount of magnesium chloride hexahydrate is an addition equivalent per a latex solid content.

The amount of potassium hydroxide is adjusted so as to exceed an equivalent for neutralizing magnesium chloride by 1.0 part or 1.5 parts. The concentration of colloidal magnesium hydroxide to be produced is adjusted by adding a suspension to a latex and adding water to the potassium hydroxide solution in such a manner that the latex concentration of a latex composition becomes a predetermined concentration.

In the case of the used NBR latex, the pH of the latex composition is about 9.3 when the amount of excessive potassium hydroxide is 1.0 part; the pH of the latex composition is about 9.7 when the amount of excessive potassium hydroxide is 1.5 parts.

Even when the potassium hydroxide solution is added to the solution of magnesium chloride hexahydrate, colloidal magnesium hydroxide is similarly prepared.

Even when any other water-soluble magnesium salt is used, a colloidal magnesium hydroxide suspension is similarly prepared.

Alternatively, a magnesium hydroxide suspension prepared in the same manner as in the following section titled "Preparation of calcium hydroxide" can be used instead of colloidal magnesium hydroxide.

Preparation of Calcium Hydroxide

Quicklime is slaked in accordance with an ordinary method, whereby a 25% calcium hydroxide suspension is prepared. After that, a predetermined amount of potassium hydroxide is added to the suspension, and the mixture is dispersed with a ball mill for 24 hours, whereby a calcium hydroxide suspension is prepared.

(2) Production of Latex Composition to which Organometallic Crosslinking Agent (Organic Aluminum Metal Crosslinking Agent or Organic Titanium Metal Crosslinking Agent) is Added A predetermined organometallic crosslinking agent is added to a latex, and the mixture is aged for 1 day. After that, when zinc oxide is added, a predetermined amount of Bayer active zinc white is added to the mixture. Further, ammonia is added in such a manner that the pH of the prepared liquid reaches a predetermined pH, whereby the latex concentration of a composition is adjusted to 33%.

As a result, no phenomena such as the production of a precipitate and an increase in viscosity of the composition were observed even after 6 months from the production of the composition. That is, the composition obtained by adding the crosslinking agent to the carboxyl-modified NBR is stable for a long time period.

It should be noted that the following procedure may be adopted as required: zinc oxide is previously added to the latex, the mixture is aged for 1 day, and the organometallic crosslinking agent is added to the mixture.

(3) Production of Latex Composition to which Organometallic Crosslinking Agent (Organic Aluminum Metal Crosslinking Agent or Organic Titanium Metal Crosslinking Agent) and Colloidal Magnesium Hydroxide are Added A predetermined organometallic crosslinking agent is added to a latex, and the mixture is aged for 1 day. After that, colloidal magnesium hydroxide prepared as described above is continuously stirred for 10 minutes, and is then left at rest for 30 minutes. After that, a predetermined amount of colloidal magnesium hydroxide is added to the above latex to which the organometallic crosslinking agent has been added. It should be noted that the order in which the above organometallic crosslinking agent and colloidal magnesium hydroxide are added can be reversed.

(4) Production of Latex Composition Obtained by Adding Water-Soluble Polymer to Latex Composition to which Organometallic Crosslinking Agent and Colloidal Magnesium Hydroxide are Added A predetermined amount of a water-soluble polymer is added to the latex composition prepared in the above item (1), (2), or (3). When the rate at which the water-soluble polymer dissolves in water is slow, a surfactant is added to dissolve the polymer. In this experiment, an Emulgen 1108 manufactured by Kao Corporation was used, but the present invention is not limited to the surfactant.

Production of Dip-Formed Article

An aqueous solution of calcium nitrate having a concentration of 15% was separately prepared as a coagulant liquid. A mold for a glove preliminarily dried at 80° C. was dipped into the solution for 2 seconds, and was lifted. After that, the mold was dried (80° C.×2 minutes) while being made horizontal and rotated. Subsequently, the mold for a glove was dipped into a dip-forming composition of each of the following comparative examples and examples for 2 seconds, and was lifted. After that, the mold was dried (80° C.×2 minutes) while being made horizontal and rotated. Next, the mold for a glove was dipped into hot water at 40° C. for 3 minutes, and was washed. After that, the mold was subjected to a heat treatment at 120° C. for 20 minutes, whereby a solid coating film product was produced on the surface of the mold for a glove. Finally, the solid coating film product was peeled from the mold for a glove, whereby a dip-formed article of a glove shape was obtained.

Method of Evaluating Dip-Formed Article

The tensile strength and elongation of each dip-formed article were measured by ordinary methods.

(1) Durability and Water Resistance Tests

A finger of the glove was cut with a pair of scissors. One continuously wore the resultant rubber film on one of his or her fingers, and the rubber film was subjected to a wearing suitability test so as to be tested for durability, creep resistance, water resistance, and the like. The rubber film was tested for durability on the basis of the number of days from the initiation of his or her continuous wearing of the rubber film on one of his or her fingers to the termination of the test; the test was terminated when the creep resistance of the rubber film was so insufficient that the rubber film swelled to elongate. The rubber film was evaluated for water resistance on the basis of the extent to which the rubber film whitened at the time of his or her wearing. The case where the film whitened to a remarkable extent was represented by x. All cases were classified into Δ, ○, and ◎ depending on the extent of the whitening.

(2) Peeling Property Test

Two gloves were superimposed between plastic films. A load of 3 kg was applied to a section of the resultant measuring 170×210 mm, and the section was left for 1 week so that the gloves were subjected to a peel test for making a decision as to whether the gloves peeled from each other. The case where the gloves could not peel from each other, and the films of which the gloves were composed adhered to each other was represented by x. The case where the gloves peeled from each other, but a force was needed for the peeling was represented by Δ. The case where the gloves peeled from each other with no difficulty was represented by ○. The case where the gloves easily peeled from each other was represented by ◎.

(3) Non-Cohesiveness Test

Two gloves were superimposed so as to be in contact with each other. Glass plates were placed above and below the superimposed gloves, and the resultant was heated with a drying machine at 90° C. for 60 minutes. Then, the gloves were taken out of the heated product. The case where the gloves could not peel from each other, and the films of which the gloves were composed adhered to each other was represented by x. The case where the gloves peeled from each other, but a force was needed for the peeling was represented by Δ. The case where the gloves peeled from each other with no difficulty was represented by ○. The case where the gloves easily peeled from each other was represented by ◎.

(Organometallic Crosslinking Agent System)

Comparative Example 1

0.4 part of ammonia (3% aqueous solution of ammonia) was added to 100 parts by weight (in terms of a solid content) of an NK-223. After that, deionized water was added to the mixture to adjust the latex concentration of the mixture to 33%, whereby a dip-forming composition for comparison was obtained.

Comparative Example 2

0.4 part of ammonia (3% aqueous solution of ammonia) was added to 100 parts by weight (in terms of a solid content) of an NK-223. After that, deionized water was added to the mixture to adjust the latex concentration of the mixture to 33%, whereby a dip-forming composition for comparison was obtained.

(Organometallic Crosslinking Agent System)
Production of Dip-Forming Composition Examples 1 to 4

0.5 part of ammonia (3% aqueous solution of ammonia) and 0.25, 0.5, 0.75, or 1.0 part of a compound having one structure represented by the general formula (I), dihydroxyaluminum octylate, were added to 100 parts by weight (in terms of a solid content) of an NK-223. On the next day, 1.2 parts of active zinc white (Bayer: zinc oxide) were added to the mixture.

After that, deionized water was added to the mixture to adjust the latex concentration of the mixture to 33%, whereby a dip-forming composition was obtained.

Examples 5 to 22

In each of Examples 5 to 22, a dip-forming composition was obtained by adding any one of various organometallic crosslinking agents to a raw material latex as shown in Table 1.

Table 1 shows the test results of the respective molded bodies.

Evaluation

In Comparative Example 1, the crosslinking of carboxyl groups is achieved with zinc oxide alone, and the crosslinking is a typical cluster ion crosslinking system. As can be seen from the results, the measured physical properties of the surface of the composition of Comparative Example 1, such as a tensile strength and an elongation did not largely differ from the results of the examples, but the durability test for rubber of which the composition was composed was terminated 2 days after the initiation of the test because the rubber elongated during a wearing test owing to its low creep resistance. A particularly outstanding feature lies in the fact that a rubber film made of the composition whitens owing to sweat from a person's hand during his or her wearing for several hours, so it can be found that the water resistance of the film is low. The result of the peeling property test is as follows: rubber films each made of the composition completely adhere to each other, and, when one strains to peel the films, the films each rupture.

In each of Examples 1 to 7, an organic aluminum metal crosslinking agent having a dihydroxyaluminum structure corresponding to the chemical structure 1 is used, so the tensile strength and elongation of a molded article of the composition of each of the examples do not largely differ from those of the molded article of Comparative Example 1. A feature of a divalent crosslinking agent appears well as in the case of sulfur vulcanization.

A rubber film made of the composition of Example 1 is no longer observed to whiten after one has worn the film as a result of the addition of 0.25 part of dihydroxyaluminum octylate.

The elongation (creep resistance) of a rubber film after one has worn the film is slightly observed in Example 1. In view of the foregoing, at the time of a durability test, he or she stopped wearing the film 1 week after the initiation of the wearing.

The whitening or elongation of the film of each of Examples 2 to 4 is hardly observed. The wearing durability of each film represented on the basis of the foregoing criterion was 2 weeks or longer when one continuously wore the film (in actuality, a test was terminated 2 weeks after the initiation of his or her wearing because the film caused no problem even after he or she had worn the film for 2 weeks); the durability was at such a level that there was no need to worry about the practicability of the film.

The result of the peel test is as described below. In Example 1, rubber films stick to each other, and it is difficult to peel the films from each other. No matter what crosslinking agent is added, the films can be peeled from each other as long as the crosslinking agent is added at a ratio of 0.5 part or more, and the ease with which the films are peeled from each other is improved as the addition ratio increases.

Example 8 relates to a system to which an organic aluminum metal crosslinking agent is added alone, the system being obtained by adding 1.0 part of the aluminum sebacate soap (I) having two dihydroxyaluminum structures corresponding to the chemical structure 2 corresponding to a monosoap of sebacic acid. The system expresses a strength. Further, the wearing suitability of the system, such as durability, creep resistance, or water resistance is extremely good, and the system is excellent in peeling property. The foregoing is positive evidence that the organic aluminum metal crosslinking agent crosslinks carboxyl groups.

Examples 9 to 19 each relate to a dicarboxylic acid-based aluminum soap crosslinking agent. The molded article of each of the examples has considerably good durability, considerably good creep resistance, considerably good water resistance, and considerably good peeling property. However, the extent to which the article elongates is somewhat small, and the article has a high tensile strength.

A molded article having a longer carbon chain tends to show better water resistance than that of a molded article having a shorter carbon chain. The tendency may be attributed to the hydrophobicity of a crosslinking agent after crosslinking. The peeling property of a molded article is also improved in association with the tendency.

In Example 11, after the tetrahydroxyaluminum sebacate soap (I) having two dihydroxyaluminum structures corresponding to the chemical structure 2 corresponding to a monosoap of sebacic acid has been synthesized, the steps of washing and drying a suspension of the aluminum soap are omitted, and the suspension is directly charged into a latex. Comparison between Example 11 and Example 8 as an object of comparison shows the following: the addition amount of ammonia in Example 11 is higher than that of Example 8 by 0.2 part, and the difference has no outstanding influences on the properties and the like of the molded article films of Examples 8 and 11. The removal of the supernatant of the suspension after the synthesis will additionally reduce the addition amount of ammonia.

The foregoing shows that a crosslinked molded article can be produced by synthesizing an organic aluminum-based crosslinking agent at the place of the production of a latex molded article and adding the crosslinking agent to a latex.

Example 20 relates to a dihydroxy organic aluminum metal crosslinking agent (glycine dihydroxyaluminum) having an amino group in any one of its side chains.

Example 21 relates to dihydroxytitanium lactate (manufactured by Matsumoto Seiyaku Kogyo Co., Ltd., Orgatix TC-310). The compound also has two hydroxyl groups each bonded to titanium, and is an effective crosslinking agent for a carboxyl-modified latex as in the case of the dihydroxy organic aluminum metal compound.

Example 22 relates to dihydroxybis (hydroxyisobutyrate) titanium. The compound also has two hydroxyl groups each bonded to titanium.

TABLE 1

| | Addition of chemical (same day) | | | Addition of chemical (next day) | |
|---|---|---|---|---|---|
| | ZnO(part(s) by weight) | $NH_3$(part(s) by weight) | Crosslinking agent (part(s) by weight) | ZnO | $NH_3$ |
| Comparative Example 1 | 1.2 | 0.4 | | | |
| Comparative Example 2 | | 0.4 | | | |
| Example 1 | | 0.5 | Compound (1) 0.25 | 1.2 | |
| Example 2 | | 0.5 | Compound (1) 0.5 | 1.2 | |
| Example 3 | | 0.5 | Compound (1) 0.75 | 1.2 | |
| Example 4 | | 0.5 | Compound (1) 1.0 | 1.2 | |
| Example 5 | 1.2 | 0.5 | | | Compound (1) 0.5 |
| Example 6 | 1.2 | 0.5 | | | Compound (2) 0.5 |
| Example 7 | 1.2 | 0.5 | | | Compound (2) 1.0 |
| Example 8 | | 0.5 | Compound (3) 1.0 | | |
| Example 9 | 1.2 | | | 0.5 | Compound (3) 0.5 |
| Example 10 | 1.2 | | | 0.5 | Compound (3) 1.0 |
| Example 11 | 1.2 | | | 0.7 | Compound (3) 1.0 |
| Example 12 | 1.2 | | | 0.5 | Compound (4) 0.5 |
| Example 13 | 1.2 | | | 0.5 | Compound (4) 1.0 |
| Example 14 | 1.2 | | | 0.5 | Compound (5) 0.5 |
| Example 15 | 1.2 | | | 0.5 | Compound (5) 1.0 |
| Example 16 | 1.2 | | | 0.5 | Compound (6) 0.5 |
| Example 17 | 1.2 | | | 0.5 | Compound (6) 1.0 |
| Example 18 | 1.2 | | | 0.5 | Compound (7) 0.5 |
| Example 19 | 1.2 | | | 0.5 | Compound (7) 1.0 |
| Example 20 | 1.2 | | | 0.4 | Compound (8) 0.5 |
| Example 21 | 1.2 | | | 0.5 | Compound (9) 0.5 |
| Example 22 | 1.2 | | Compound (10) 1.0 | 0.5 | |

| | Tensile strength Mpa | Elongation % | Durability | Creep resistance | Water resistance | Peeling property |
|---|---|---|---|---|---|---|
| Comparative Example 1 | 32.8 | 658 | 2 days (Note 1) | X | X | X (adhesion) |
| Comparative Example 2 | 11.8 | 1023 | — | No test was performed. | No test was performed. | No test was performed. |
| Example 1 | 34.3 | 683 | 5 days (Note 1) | ○ | ○ | X (adhesion) |
| Example 2 | 33.2 | 645 | 14 days or longer | ○ | ○ | Δ |

TABLE 1-continued

| | | | | | | | |
|---|---|---|---|---|---|---|---|
| Example 3 | 33.6 | 650 | 14 days or longer | ◎ | ○ | ○ | |
| Example 4 | 35.4 | 630 | 14 days or longer | ◎ | ○ | ◎ | |
| Example 5 | 32.9 | 650 | 14 days or longer | ○ | ○ | △ | |
| Example 6 | 32.5 | 635 | 14 days or longer | ◎ | ◎ | ◎ | |
| Example 7 | 32 | 620 | 14 days or longer | ◎ | ◎ | ◎ | |
| Example 8 | 20.5 | 825 | 14 days or longer | ◎ | ○ | ◎ | |
| Example 9 | 37.6 | 633 | 14 days or longer | ◎ | ○ | ○ | |
| Example 10 | 36.5 | 618 | 14 days or longer | ◎ | ○ | ◎ | |
| Example 11 | 35.4 | 610 | 14 days or longer | ◎ | ◎ | ◎ | |
| Example 12 | 39.7 | 650 | 14 days or longer | ○ | ○ | ○ | |
| Example 13 | 34.4 | 630 | 14 days or longer | ◎ | ○ | ◎ | |
| Example 14 | 38 | 640 | 14 days or longer | ◎ | ○ | ○ | |
| Example 15 | 36.5 | 620 | 14 days or longer | ◎ | ○ | ○ | |
| Example 16 | 36 | 635 | 14 days or longer | ◎ | ◎ | ◎ | |
| Example 17 | 35.2 | 630 | 14 days or longer | ◎ | ◎ | ◎ | |
| Example 18 | 34.5 | 625 | 14 days or longer | ◎ | ◎ | ◎ | |
| Example 19 | 31.5 | 620 | 14 days or longer | ◎ | ◎ | ◎ | |
| Example 20 | 33.5 | 648 | 14 days or longer | ○ | ○ | △ | |
| Example 21 | 31.1 | 657 | 14 days or longer | ○ | ○ | ○ | |
| Example 22 | 33.7 | 635 | 14 days or longer | ◎ | ◎ | ◎ | |

(Note 1)
The test was terminated because rubber elongated owing to its insufficient creep resistance.
Compound (1): dihydroxyaluminum octylate
Compound (2): dihydroxyaluminum rosinate
Compound (3): tetrahydroxyaluminum sebacate soap (I)
Compound (4): aluminum sebacate soap (II)
Compound (5): aluminum sebacate soap (III)
Compound (6): DIACID tetrahydroxyaluminum soap
Compound (7): C12 aluminum alkenyl succinic acid soap
Compound (8): glycine dihydroxyaluminum
Compound (9): dihydroxytitanium lactate
Compound (10): dihydroxybis(hydroxyisobutyrate)titanium (Organic Aluminum Metal Crosslinking Agent+Colloidal Magnesium Hydroxide System)

Examples 23 to 27

0.3 part of the C12 aluminum alkenyl succinic acid soap (Example 23), 0.3 part of dihydroxyaluminum rosinate (Example 24), 1.0 part of the C12 aluminium alkenyl succinic acid soap (Example 25), 1.0 part of dihydroxyaluminum rosinate (Example 26), or 0.3 part of dihydroxytitanium lactate (Example 27) was added to 100 parts by weight of an NK-223. On the next day, colloidal magnesium hydroxide (0.4 part (in terms of MgO) in each of Examples 23, 24, and 27 or 0.2 part (in terms of MgO) in each of Examples 25 and 26) was added to the mixture, whereby a dip-forming composition was obtained. The latex concentration of the composition was adjusted to 30%.

Table 2 shows the test results of the dip-formed articles of Examples 23 to 27.

Evaluation

Each of Examples 23 and 24 shows that the addition of a small amount of an organic aluminum metal crosslinking agent to colloidal magnesium hydroxide improves the creep resistance and water resistance of a colloidal magnesium hydroxide system.

Each of Examples 25 and 26 shows that the addition of an organic aluminum metal crosslinking agent alone provides a dip-formed article with a low tensile strength, but the addition of colloidal magnesium hydroxide can provide the article with a sufficient strength.

The same discussion as that of an organic aluminum metal crosslinking agent holds true for dihydroxytitanium lactate of Example 27.

These experiments show that a latex molded article can be obtained without the use of any zinc compound as a heavy metal.

That is, an environmentally friendly product free of sulfur, a vulcanization accelerator, and zinc white can be produced.

TABLE 2

| | Addition of chemical (same day) Crosslinking agent (part by weight) | Addition of chemical (next day) Colloidal magnesium hydroxide Mg (part by weight) | 300% modulus | Tensile strength Mpa | Elongation % | Durability | Creep resistance | Water resistance | Peeling property |
|---|---|---|---|---|---|---|---|---|---|
| Example 23 | Compound (7) 0.3 | 0.4 | 2.3 | 29.5 | 750 | 14 days or longer | ○ | ○ | ◎ |
| Example 24 | Compound (2) 0.3 | 0.4 | 2.2 | 30.4 | 760 | 14 days or longer | ○ | ○ | ◎ |
| Example 25 | Compound (7) 1.0 | 0.2 | 2.1 | 25.8 | 770 | 14 days or longer | ◎ | ◎ | ◎ |
| Example 26 | Compound (2) 1.0 | 0.2 | 2.4 | 26 | 775 | 14 days or longer | ◎ | ◎ | ◎ |

TABLE 2-continued

| | Addition of chemical (same day) Crosslinking agent (part by weight) | Addition of chemical (next day) Colloidal magnesium hydroxide Mg (part by weight) | 300% modulus | Tensile strength Mpa | Elongation % | Durability | Creep resistance | Water resistance | Peeling property |
|---|---|---|---|---|---|---|---|---|---|
| Example 27 | Compound (9) 0.3 | 0.4 | 2.5 | 28.4 | 740 | 14 days or longer | ○ | ○ | ◎ |

Compound (7): C12 aluminum alkenyl succinic acid soap
Compound (2): dihydroxyaluminum rosinate
Compound (9): dihydroxytitanium lactate (Organic Aluminum Metal Crosslinking Agent+Water-Soluble Polymer-Added System)

Example 28

0.75 part of the tetrahydroxyaluminum sebacate soap (I) having two dihydroxyaluminum structures and 0.5 part of ammonia were added to 100 parts by weight of an NK-223. On the next day, 1.2 parts of zinc oxide were added to the mixture. Next, 0.15 part of hydrophobized ethylhydroxyethylcellulose (manufactured by Akzo Nobel, Bermocoll EHM-200, dissolved in a 0.5% solution of an Emulgen 1108) was added to the mixture, whereby a dip-forming composition was obtained. The latex concentration of the composition was adjusted to 30%.

Example 29

A dip-forming composition was produced in the same manner as in Example 28 except that 0.15 part of a water-soluble polyvinyl acetal (S-LEC KW-3 manufactured by SEKISUI CHEMICAL CO., LTD.) was added as a water-soluble polymer.

Example 30

A dip-forming composition was produced in the same manner as in Example 28 except that 0.15 part of a tamarind-gum (GLYROID manufactured by Dainippon Sumitomo Pharma Co., LTD.) was added as a water-soluble polymer.

Example 31

A dip-forming composition was produced in the same manner as in Example 28 except that 0.15 part of a PVA (DENKA POVAL B-20) was added as a water-soluble polymer.

Example 32

A dip-forming composition was produced in the same manner as in Example 28 except that 0.1 part of an ethyleneoxide-propyleneoxide random polymer (ALKOX EP-10 manufactured by MEISEI CHEMICAL WORKS, LTD) was added as a water-soluble polymer.

Evaluation

The addition of a water-soluble polymer to a latex results in the formation of the so-called protective colloid, isolates a latex particle and a free surfactant, promotes the emission of the surfactant in a production step for a dip-formed article such as leaching, and suppresses the migration of the surfactant. As a result, the so-called slimy touch due to the surfactant or a calcium salt of the surfactant is eliminated from the article, and the cohesiveness of the article is also reduced.

In particular, the use of a water-soluble polymer having hydrophobicity provides the surface of a product with a refreshing feeling.

As shown in Table 3, the water-soluble polymer used in each of the examples improves the peeling property and water resistance of a product, and reduces the sticky feeling of the product in spite of the fact that the polymer is added in a small amount.

(Organic Aluminum Metal Crosslinking Agent+Colloidal Magnesium Hydroxide+Water-Soluble Polymer-Added System)

Example 33

1.0 part of the C12 aluminum alkenyl succinic acid soap as a mixture of a monosoap and a disoap, and 0.2 part of ammonia were added to 100 parts by weight of an NK-223. On the next day, 0.2 part (in terms of MgO) of colloidal magnesium hydroxide was added to the mixture. Next, 0.15 part of hydrophobized ethylhydroxyethylcellulose (manufactured by Akzo Nobel, Bermocoll EHM-200, dissolved in a 0.5% solution of an Emulgen 1108) was added to the mixture, whereby a dip-forming composition was obtained. The latex concentration of the composition was adjusted to 30%.

Example 34

A dip-forming composition was produced in the same manner as in Example 33 except that 0.15 part of a water-soluble polyvinyl acetal (S-LEC KW-3 manufactured by SEKISUI CHEMICAL CO., LTD.) was added as a water-soluble polymer.

Example 35

A dip-forming composition was produced in the same manner as in Example 33 except that 0.15 part of a tamarind-gum (GLYROID manufactured by Dainippon Sumitomo Pharma Co., LTD.) was added as a water-soluble polymer.

Example 36

A dip-forming composition was produced in the same manner as in Example 33 except that 0.15 part of a PVA (DENKA POVAL B-20) was added as a water-soluble polymer.

Table 3 shows the test results of the dip-formed articles of Examples 28 to 36.

Evaluation

The addition of a water-soluble polymer to a latex results in the formation of the so-called protective colloid, isolates a latex particle and a free surfactant, promotes the emission of the surfactant in a production step for a dip-formed article such as leaching, and suppresses the migration of the surfactant. As a result, the so-called slimy touch due to the surfactant or a calcium salt of the surfactant is eliminated from the article, and the cohesiveness of the article is also reduced.

In particular, the use of a water-soluble polymer having hydrophobicity provides the surface of a product with a refreshing feeling.

The water-soluble polymer used in each of the examples improves the peeling property and water resistance of a product, and reduces the sticky feeling of the product in spite of the fact that the polymer is added in a small amount.

parts by weight of an NK-223. On the next day, 1.2 parts of zinc oxide and 0.5 part of ammonia were added to the mixture, whereby a dip-forming composition was produced.

Upon production of a molded article, in Example 37, aluminum nitrate was dissolved in a calcium nitrate coagulant liquid in such a manner that the concentration of aluminum nitrate was 0.5% (in terms of $Al_2O_3$), and the molded article was produced from the coagulant liquid (the mold side of the article was treated with a cationic carboxyl group blocking agent). After having been leached, a molded film was dried at 80° C. for 1 minute. Then, the molded film was dipped into a 1% liquid of a POLYMARON 360 (manufactured by

TABLE 3

| | Addition of chemical (same day) | | Addition of chemical (next day) | | | |
|---|---|---|---|---|---|---|
| | NH3 | Crosslinking agent (part by weight) | ZnO (part by weight) | Water-soluble polymer (part by weight) | Colloidal magnesium hydroxide (part by weight) | Tensile strength Mpa |
| Example 28 | 0.5 | Compound (3) 0.75 | 1.2 | Hydrophobized ethylhydroxyethylcellulose 0.15 | — | 35.8 |
| Example 29 | 0.5 | Compound (3) 0.75 | 1.2 | Water-soluble polyvinyl acetal 0.15 | — | 36 |
| Example 30 | 0.5 | Compound (3) 0.75 | 1.2 | Tamarind gum 0.15 | — | 35.9 |
| Example 31 | 0.5 | Compound (3) 0.75 | 1.2 | Polyvinyl alcohol 0.15 | — | 36.2 |
| Example 32 | 0.5 | Compound (3) 0.75 | 1.2 | Ethylene oxide-propylene oxide random polymer 0.1 | — | 37.3 |
| Example 33 | 0.2 | Compound (7) 1.0 | | Hydrophobized ethylhydroxyethylcellulose 0.15 | 0.2 | 31.8 |
| Example 34 | 0.2 | Compound (7) 1.0 | | Water-soluble polyvinyl acetal 0.15 | 0.2 | 32.5 |
| Example 35 | 0.2 | Compound (7) 1.0 | | Tamarind gum 0.15 | 0.2 | 34.1 |
| Example 36 | 0.2 | Compound (7) 1.0 | | Polyvinyl alcohol 0.15 | 0.2 | 33.6 |

| | Durability | Creep resistance | Water resistance | Peeling property | Remark |
|---|---|---|---|---|---|
| Example 28 | 14 days or longer | ◎ | ◎ | ◎ | No slimy touch |
| Example 29 | 14 days or longer | ◎ | ◎ | ◎ | No slimy touch |
| Example 30 | 14 days or longer | ◎ | ◎ | ◎ | No slimy touch |
| Example 31 | 14 days or longer | ◎ | ○ | ○ | No slimy touch |
| Example 32 | 14 days or longer | ◎ | ◎ | ◎ | No slimy touch |
| Example 33 | 14 days or longer | ◎ | ◎ | ◎ | No slimy touch |
| Example 34 | 14 days or longer | ◎ | ◎ | ◎ | No slimy touch |
| Example 35 | 14 days or longer | ◎ | ◎ | ◎ | No slimy touch |
| Example 36 | 14 days or longer | ◎ | ◎ | ◎ | No slimy touch |

Compound (3): tetrahydroxyaluminum sebacate soap
Compound (7): C12 aluminum alkenyl succinic acid soap (Organic Aluminum Metal Crosslinking Agent+Cationic Carboxyl Group Blocking Agent Surface-Treated System)

Examples 37 to 40

0.75 part of the tetrahydroxyaluminum sebacate soap (I) having two dihydroxyaluminum structures was added to 100 Arakawa Chemical Industries, Ltd., a styrene-based surface sizing agent having a quaternary ammonium base) (the outer surface side of the film was treated with a cationic carboxyl group blocking agent), dried at 90° C. for 2 minutes, leached for an additional 1 minute, and, thereafter, dried under heat as usual.

In Example 38, a surface-treated molded film was produced in the same manner as in Example 37 except that 0.5% (in terms of $ZrO_2$) of zirconium nitrate was dissolved in the coagulant liquid.

In Example 39, a surface-treated molded film was produced by using 0.5% of a polyamide-amine-epichlorohydrin condensation reaction product (WS4020, manufactured by SEIKO PMC CORPORATION) as a coagulant liquid and a 1% (in terms of $Al_2O_3$) liquid of polyaluminum hydroxide chloride (ALUFINE 83, manufactured by TAIMEI CHEMICALS CO., LTD.) in a treatment for the outer surface side of the film.

In Example 40, a surface-treated molded film was produced by: dissolving 0.5% of water-soluble chitosan (manufactured by Dainichiseika Color & Chemicals Mfg. Co., Ltd.) in a calcium nitrate coagulant liquid; and using a 1% liquid of a water-soluble chitosan in a treatment for the outer surface side of the film. The surface-treated molded film was produced in the same manner as in Example 37 except that the water-soluble chitosan was dissolved in the coagulant liquid.

(Organic Aluminum Metal Crosslinking Agent+Water-Soluble Polymer+Surface-Treated System)

Examples 41 to 43

0.75 part of the tetrahydroxyaluminum sebacate soap (I) having two dihydroxyaluminum structures was added to 100 parts by weight of an NK-223. On the next day, 1.2 parts of zinc oxide, 0.5 part of ammonia, and 0.15 part of hydrophobized ethylhydroxyethylcellulose (manufactured by Akzo Nobel, Bermocoll EHM-200, dissolved in a 0.5% solution of an Emulgen 1108) were added to the mixture, whereby a dip-forming composition was obtained. The latex concentration of the composition was adjusted to 30%.

In Example 41, aluminum nitrate was dissolved in a calcium nitrate coagulant liquid in such a manner that the concentration of aluminum nitrate was 0.5% (in terms of $Al_2O_3$), and the molded article was produced from the coagulant liquid. After having been leached, a molded film was dried at 80° C. for 1 minute. Then, the molded film was dipped into a 1% liquid of a POLYMARON 360 (manufactured by Arakawa Chemical Industries, Ltd., a styrene-based surface sizing agent having a quaternary ammonium base), dried at 90° C. for 2 minutes, leached for an additional 1 minute, and, thereafter, dried under heat as usual.

In Example 42, a surface-treated molded film was produced in the same manner as in Example 41 except that 0.5% (in terms of $ZrO_2$) of zirconium nitrate was dissolved in the coagulant liquid.

In Example 43, a surface-treated molded film was produced by using 0.5% of a cationic polyamide-amine-epichlorohydrin condensation reaction product (WS4020, manufactured by SEIKO PMC CORPORATION) as a coagulant liquid and a 1% (in terms of $Al_2O_3$) liquid of polyaluminum hydroxide chloride in a treatment for the outer surface side of the film.

Table 4 shows the test results.

A treatment with a cationic carboxyl group blocking agent was performed in a film formation step in this experiment, but a product can be released from a mold before the product is treated by being dipped into a cationic carboxyl group blocking agent liquid.

TABLE 4

| | Addition of chemical (same day) | Addition of chemical (next day) | | | | | | |
|---|---|---|---|---|---|---|---|---|
| | Crosslinking agent (part by weight) | ZnO (part by weight) | NH3 (part by weight) | Water-soluble polymer (part by weight) | Treatment with cationic carboxyl group blocking agent | | Peeling property | Non-cohesiveness |
| | | | | | Mold side | Outer surface side | | |
| Example 37 | Compound (3) 0.75 | 1.2 | 0.5 | | Aluminum nitrate 0.5% | Quaternary ammonium base-containing styrene-based surface sizing agent 1.0% | ◎ | ◎ |
| Example 38 | Compound (3) 0.75 | 1.2 | 0.5 | | Zirconium nitrate 0.5% | Quaternary ammonium base-containing styrene-based surface sizing agent 1.0% | ◎ | ◎ |
| Example 39 | Compound (3) 0.75 | 1.2 | 0.5 | | Polyamide-amine-epichlorohydrin condensation reaction product 0.5% | Aluminum hydroxide chloride 1.0% | ◎ | ◎ |
| Example 40 | Compound (3) 0.75 | 1.2 | 0.5 | | Water-soluble chitosan 0.5% | Water-soluble chitosan 1.0% | ◎ | ◎ |
| Example 41 | Compound (3) 0.75 | 1.2 | 0.5 | Bermocoll EHM-200, 0.15 | Aluminum nitrate 0.5% | Quaternary ammonium base-containing styrene-based surface sizing agent 1.0% | ◎ | ◎ |

TABLE 4-continued

| | Addition of chemical (same day) | Addition of chemical (next day) | | | Treatment with cationic carboxyl group blocking agent | | | |
|---|---|---|---|---|---|---|---|---|
| | Crosslinking agent (part by weight) | ZnO (part by weight) | NH3 (part by weight) | Water-soluble polymer (part by weight) | Mold side | Outer surface side | Peeling property | Non-cohesiveness |
| Example 42 | Compound (3) 0.75 | 1.2 | 0.5 | Bermocoll EHM-200, 0.15 | Zirconium nitrate 0.5% | Quaternary ammonium base-containing styrene-based surface sizing agent 1.0% | ◎ | ◎ |
| Example 43 | Compound (3) 0.75 | 1.2 | 0.5 | Bermocoll EHM-200, 0.15 | Polyamide-amine-epichlorohydrin condensation reaction product 0.5% | Aluminum hydroxide chloride 1.0% | ◎ | ◎ |

Compound (3): tetrahydroxyaluminum sebacate soap (Organic Aluminum Metal Crosslinking Agent+Colloidal Magnesium Hydroxide+Surface-Treated System)

Examples 44 to 47

1.0 part of the C12 aluminum alkenyl succinic acid soap was added to 100 parts by weight of an NK-223. On the next day, 0.2 part (in terms of MgO) of colloidal magnesium hydroxide was added to the mixture, whereby a dip-forming composition was obtained. The latex concentration of the composition was adjusted to 30%.

In Example 44, aluminum nitrate was dissolved in a calcium nitrate coagulant liquid in such a manner that the concentration of aluminum nitrate was 0.5% (in terms of $Al_2O_3$), and the molded article was produced from the coagulant liquid. After having been leached, a molded film was dried at 80° C. for 1 minute. Then, the molded film was dipped into a 1% liquid of a POLYMARON 360 (manufactured by Arakawa Chemical Industries, Ltd., a styrene-based surface sizing agent having a quaternary ammonium base), dried at 90° C. for 2 minutes, leached for an additional 1 minute, and, thereafter, dried under heat as usual.

In Example 45, a surface-treated molded film was produced in the same manner as in Example 44 except that 0.5% (in terms of $ZrO_2$) of zirconium nitrate was dissolved in the coagulant liquid. In Example 46, a surface-treated molded film was produced by using 0.5% of a cationic polyamide-amine-epichlorohydrin condensation reaction product (WS4020, manufactured by SEIKO PMC CORPORATION) as a coagulant liquid and a 1% (in terms of $Al_2O_3$) liquid of polyaluminum hydroxide chloride in a treatment for the outer surface side of the film.

In Example 47, a surface-treated molded film was produced by: dissolving 0.5% of water-soluble chitosan (manufactured by Dainichiseika Color & Chemicals Mfg. Co., Ltd.) in a calcium nitrate coagulant liquid; and using a 1% liquid of a water-soluble chitosan in a treatment for the outer surface side of the film.

(Organic Aluminum Metal Crosslinking Agent+Colloidal Magnesium Hydroxide+Water-Soluble Polymer+Surface-Treated System)

Examples 48 to 50

1.0 part of the C12 aluminum alkenyl succinic acid soap was added to 100 parts by weight of an NK-223. On the next day, 0.2 part (in terms of MgO) of colloidal magnesium hydroxide was added to the mixture, and, furthermore, 0.15 part of hydrophobized ethylhydroxyethylcellulose (manufactured by Akzo Nobel, Bermocoll EHM-200, dissolved in a 0.5% solution of an Emulgen 1108) was added to the mixture, whereby a dip-forming composition was obtained. The latex concentration of the composition was adjusted to 30%.

In Example 48, aluminum nitrate was dissolved in a calcium nitrate coagulant liquid in such a manner that the concentration of aluminum nitrate was 0.5% (in terms of $Al_2O_3$), and the molded article was produced from the coagulant liquid. After having been leached, a molded film was dried at 80° C. for 1 minute. Then, the molded film was dipped into a 1% liquid of a POLYMARON 360 (manufactured by Arakawa Chemical Industries, Ltd., a styrene-based surface sizing agent having a quaternary ammonium base), dried at 90° C. for 2 minutes, leached for an additional 1 minute, and, thereafter, dried under heat as usual.

In Example 49, a surface-treated molded film was produced in the same manner as in Example 48 except that 0.5% (in terms of $ZrO_2$) of zirconium nitrate was dissolved in the coagulant liquid.

In Example 50, a surface-treated molded film was produced by using 0.5% of a cationic polyamide-amine-epichlorohydrin condensation reaction product (WS4020, manufactured by SEIKO PMC CORPORATION) as a coagulant liquid and a 1% (in terms of $Al_2O_3$) liquid of alumina sol (AIUMINA SOL 100, manufactured by NISSAN CHEMICAL INDUSTRIES, LTD.) in a treatment for the outer surface side of the film.

(Organic Titanium Metal Crosslinking Agent+Colloidal Magnesium Hydroxide+Surface-Treated System)

Examples 51 to 54

A mixture of 0.8 part of dihydroxytitanium lactate having a structure represented by the general formula (3) (manufactured by Matsumoto Seiyaku Kogyo Co., Ltd., Orgatix TC-310) and 0.6 part of ammonia was added to 100 parts by weight of an NK-223. On the next day, 0.2 part (in terms of MgO) of colloidal magnesium hydroxide was added to the mixture, whereby a dip-forming composition was produced. The latex concentration of the composition was adjusted to 30%.

In Example 51, polyaluminum hydroxide chloride (ALUFINE 83, manufactured by TAIMEI CHEMICALS CO., LTD.) was dissolved in a calcium nitrate coagulant liquid in such a manner that the concentration (in terms of $Al_2O_3$) of the liquid was 0.5%, and a molded article was produced from the coagulant liquid. After having been leached, a molded film was dried at 80° C. for 1 minute. Then, the molded film was dipped into a 1% liquid of a POLYMARON 360 (manufactured by Arakawa Chemical Industries, Ltd., a styrene-based surface sizing agent having a quaternary ammonium base), dried at 90° C. for 2 minutes, leached for an additional 1 minute, and, thereafter, dried under heat as usual.

In Example 52, a surface-treated molded film was produced in the same manner as in Example 51 except that 0.5% (in terms of $ZrO_2$) of zirconium nitrate was dissolved in the coagulant liquid.

In Example 53, a surface-treated molded film was produced by using 0.5% of a cationic polyamide-amine-epichlorohydrin condensation reaction product (WS4020, manufactured by SEIKO PMC CORPORATION) as a coagulant liquid and a 1% (in terms of $Al_2O_3$) liquid of polyaluminum hydroxide chloride in a treatment for the outer surface side of the film.

In Example 54, a surface-treated molded film was produced by: dissolving 0.5% of water-soluble chitosan (manufactured by Dainichiseika Color & Chemicals Mfg. Co., Ltd.) in a calcium nitrate coagulant liquid; and using a 1% liquid of a water-soluble chitosan in a treatment for the outer surface side of the film.

Table 5 shows the test results of the dip-formed articles of Examples 44 to 54.

Evaluation

Examples 37 to 54 each relate to an experiment concerning a treatment for the surface of a dip-formed article with a carboxyl group blocking agent.

The inventors of the present invention consider that molded article films adhere to each other owing to a chemical bond such as a hydrogen bond. However, when all carboxyl groups are blocked with a carboxyl group blocking agent, the crosslinking of the molecules of a latex advances excessively, with the result that the latex loses its rubber-like properties. In view of the foregoing, the inventors have thought that the films can be prevented from adhering to each other by blocking only carboxyl groups on the surface of each molded article film. A treatment for the surface of a product is effective in preventing the adhesion.

The experiment carried out in each of Examples 37 to 54 showed that an effect of the carboxyl group blocking agent was observed, and it is worthy of special note that a zirconium compound which was merely a divalent cation was also able to impart non-cohesiveness to a product.

TABLE 5

| | Addition of chemical (same day) | | Addition of chemical (next day) | | | | | |
|---|---|---|---|---|---|---|---|---|
| | Crosslinking agent | | Colloidal magnesium hydroxide | Water-soluble polymer | Treatment with cationic carboxyl group blocking agent | | | |
| | (part by weight) | NH3 (part by weight) | (part by weight) | (part by weight) | Mold side | Outer surface side | Peeling property | Non-cohesiveness |
| Example 44 | Compound (7) 1.0 | | 0.2 | | Aluminum nitrate 0.5% | POLYMARON 360 1% | ◎ | ◎ |
| Example 45 | Compound (7) 1.0 | | 0.2 | | Zirconium nitrate 0.5% | POLYMARON 360 1% | ◎ | ◎ |
| Example 46 | Compound (7) 1.0 | | 0.2 | | Chlorohydrin condensation reaction product 0.5% | Polyaluminum hydroxide chloride 1% | ◎ | ◎ |
| Example 47 | Compound (7) 1.0 | | 0.2 | | Water-soluble chitosan 0.5% | Water-soluble chitosan 1% | ◎ | ◎ |
| Example 48 | Compound (7) 1.0 | | 0.2 | Hydrophobized ethylhydroxyethylcellulose 0.15 | Aluminum nitrate 0.5% | POLYMARON 360 1% | ◎ | ◎ |
| Example 49 | Compound (7) 1.0 | | 0.2 | Hydrophobized ethylhydroxyethylcellulose 0.15 | Zirconium nitrate 0.5% | POLYMARON 360 1% | ◎ | ◎ |
| Example 50 | Compound (7) 1.0 | | 0.2 | Hydrophobized ethylhydroxyethylcellulose 0.15 | Chlorohydrin condensation reaction product 0.5% | Alumina sol 1% | ◎ | ◎ |
| Example 51 | Compound (9) 0.8 | 0.6 | 0.2 | | Polyaluminum hydroxide chloride 0.5% | POLYMARON 360 1% | ◎ | ◎ |
| Example 52 | Compound (9) 0.8 | 0.6 | 0.2 | | Zirconium nitrate 0.5% | POLYMARON 360 1% | ◎ | ◎ |
| Example 53 | Compound (9) 0.8 | 0.6 | 0.2 | | Chlorohydrin condensation reaction product 0.5% | Polyaluminum hydroxide chloride 1% | ◎ | ◎ |

TABLE 5-continued

|  | Addition of chemical (same day) | | Addition of chemical (next day) | | Treatment with cationic carboxyl group blocking agent | | Peeling property | Non-cohesiveness |
|---|---|---|---|---|---|---|---|---|
|  | Crosslinking agent (part by weight) | NH3 (part by weight) | Colloidal magnesium hydroxide (part by weight) | Water-soluble polymer (part by weight) | Mold side | Outer surface side | | |
| Example 54 | Compound (9) 0.8 | 0.6 | 0.2 | | Water-soluble chitosan 0.5% | Water-soluble chitosan 1% | ◉ | ◉ |

Compound (7): C12 aluminum alkenyl succinic acid soap
Compound (9): dihydroxytitanium lactate System to which Hydrophobic Substance or the Like is Added In each of the following examples, an NK-220 manufactured by NIPPON A & L INC. was used as a carboxyl-modified NBR. The amount of bonded methacrylic acid of the latex is 4.5%, which is small as compared to that of the NK-223, that is, 6%.

The basic formulation of the latex is as follows: 100 parts by weight of the NK-220 were blended with 1.5 parts of Bayer active zinc white and 0.4 part of ammonia, and then an organometallic crosslinking agent and, for example, a hydrophobic substance were added to the mixture.

Water-soluble dihydroxyaluminum lactate (TAKI CHEMICAL CO., LTD., M-160P) and synthesized tetrahydroxyaluminum adipate were each used as the organometallic crosslinking agent. The addition amount of each of both the organometallic crosslinking agents was 1.1 parts per the latex.

In addition, the addition amount of the hydrophobic substance or the like was 0.75 part. Table 6 shows details about each hydrophobic substance.

The latex concentration of a prepared liquid was 30%.

Production of Dip-Formed Article

A dip-formed article was produced in substantially the same manner as in a glove except that a test tube having a diameter of 16 mm and subjected to sand blasting was used as a mold and a coagulant liquid contained calcium nitrate tetrahydrate at a concentration of 450 g/1,000 g because the glass mold had small coagulant liquid holding power.

The glass mold was dipped into the coagulant liquid for 2 minutes, and was dried with a drier. After that, the resultant was dipped into the latex prepared liquid for 10 seconds, dried at 75° C. for 3 minutes, and leached with hot water at 50° C. for 3 minutes. After that, the resultant was dried at 95° C. for 3 minutes and then at 110° C. for 10 minutes. A finally produced solid coating film product was peeled from the mold, whereby a finger cot-like dip-formed article was obtained.

Non-Cohesiveness Test

The molded article obtained by this method was tested for non-cohesiveness as described below. Upon peeling of the produced solid coating film product from the mold, the film was released by being hoisted above the mold. The film was placed in a drying machine while being hoisted, and was dried at 90° C. for 60 minutes. After that, the sample was taken out of the drying machine, and was tested for whether the sample rewound. The case where the sample easily rewound was represented by ◉. The case where the sample rewound was represented by ○. The case where the sample rewound with resistance was represented by Δ. The case where the sample did not rewind was represented by x.

Examples 55 and 56

In each of Examples 55 and 56, a prepared liquid having a latex concentration of 30% was prepared by adding 1.1 parts of a water-soluble organometallic crosslinking agent (dihydroxyaluminum lactate) or an organometallic crosslinking agent containing no hydrophobic group (tetrahydroxyaluminum adipate).

System to which Hydrophobic Substance or the Like is Added

Examples 57 to 68

In each of Examples 57 to 68, 1.1 parts of a water-soluble organometallic crosslinking agent (dihydroxyaluminum lactate) or an organometallic crosslinking agent containing no hydrophobic group (tetrahydroxyaluminum adipate) and 0.75 part of any one of various hydrophobic compounds were added to 100 parts by weight of an NK-220, whereby a prepared liquid having a latex concentration of 30% was prepared.

Table 6 shows the results of a molded article produced from the dip-forming composition.

It should be noted that the used hydrophobic compounds are as shown below.

Example 57 disoap of aluminum octylate (Hope Chemical Co., Ltd: Octoap alumi A)
Example 58: disproportionated rosin (Harima Chemicals, Inc: BANDIS T-25K)
Example 59: C-21 dicaroboxylic acid (Harima Chemicals, Inc: DIACID1550)
Example 60: C-12 alkenyl potassium succinate (SEIKO PMC CORPORATION: GS1945)
Example 61: mixture of a paraffin wax and a low-molecular-weight polyethylene (NIPPON SEIRO CO., LTD: XEM5036) (melting point; 114° C., particle diameter; 4 μm)
Example 62: styrene-based polymer (Saiden Chemical Industry Co., Ltd: Saivinol PG-1) (particle diameter; 0.6 to 0.7 μm)
Example 63: alkyl methacrylate polymer (Saiden Chemical Industry Co., Ltd: Saivinol PG-2) (particle diameter; 3 to 5 μm)
Example 64: low-molecule-weight polyethylene (Mitsui Chemicals, Inc.: CHEMIPEARL W4005) (particle diameter; 0.6 μm)
Example 65: ethylene-based thermoplastic elastomer (Mitsui Chemicals, Inc.: CHEMIPEARL A100) (particle diameter; 4 μm)

Example 66: ethylene vinyl acetate copolymer resin (Mitsui Chemicals, Inc.: CHEMIPEARL V300) (particle diameter; 6 µm)
Example 67: low-density polyethylene (Mitsui Chemicals, Inc.: CHEMIPEARL M200) (particle diameter; 6 µm)
Example 68: Petroleum emulsion (TOHO Chemical Industry Co., Ltd: TFE-22)

System to which Calcium Hydroxide and Hydrophobic Substance or the Like are Added In each of Examples 69 to 71, a prepared liquid having a latex concentration of 30% was prepared by adding 0.35 part (in terms of MgO, 0.49 part in terms of CaO) of calcium hydroxide dispersed by adding potassium hydroxide (1.5 parts with respect to a latex) instead of active zinc white to 100 parts by weight of an NK-220 and further adding 1.0 part of a water-soluble organometallic crosslinking agent (dihydroxyaluminum lactate) and 0.75 part of a hydrophobic substance to 100 parts by weight of the NK-220.

Table 7 shows the results of a molded article produced from the dip-forming composition.
Example 69: C-12 potassium alkenyl succinate (SEIKO PMC CORPORATION: GS1945)
Example 70: Petroleum emulsion (TOHO Chemical Industry Co., Ltd: TFE-22)
Example 71: low-molecule-weight polyethylene (Mitsui Chemicals, Inc.: CHEMIPEARL W4005) (particle diameter; 0.6 µm)

Evaluation

In each of Examples 55 and 56, a molded article of a latex composition to which only a water-soluble organometallic crosslinking agent and a low-molecular-weight organometallic crosslinking agent are added is evaluated for its quality. The molded article has a good tensile strength, good water resistance, good durability, and good creep resistance, but does not have sufficient non-cohesiveness.

Examples 57 to 66 each relate to a system obtained by adding any one of various hydrophobic group-containing compounds to water-soluble dihydroxyaluminum lactate. The system has a good tensile strength, good water resistance, good durability, and good creep resistance, and a product composed of the system is made non-cohesive.

Examples 67 and 68 each relate to the case where tetrahydroxyaluminum adipate having a low molecular weight and poor in hydrophobicity is used as a crosslinking agent. A product using the crosslinking agent alone is poor in non-cohesiveness, but a product composed of a system obtained by adding any one of various hydrophobic group-containing compounds as well as the crosslinking agent is made non-cohesive.

As described above, the addition of a hydrophobic group-containing compound can impart non-cohesiveness to a product even when an organometallic crosslinking agent used in the product has no hydrophobic structure.

In addition, Examples 69 to 71 each relate to a system to which calcium hydroxide dispersed by adding potassium hydroxide is added instead of active zinc white; a product composed of a system obtained by adding a water-soluble organometallic crosslinking agent and a hydrophobic group-containing compound is made non-cohesive.

TABLE 6

| | Addition of chemical (same day) | | | | | | | | |
|---|---|---|---|---|---|---|---|---|---|
| | ZnO (part(s) by weight) | NH3 (part(s) by weight) | Crosslinking agent (part(s) by weight) | Hydrophobic substance (part(s) by weight) | Tensile strength Mpa | Durability | Creep resistance | Water resistance | Non-cohesiveness |
| Example 55 | 1.5 | 0.4 | Compound (11) 1.1 | — | 23.2 | 14 days or longer | ◎ | ◎ | Δ-x |
| Example 56 | 1.5 | 0.4 | Compound (12) 1.1 | — | 23.9 | 14 days or longer | ◎ | ◎ | Δ |
| Example 57 | 1.5 | 0.4 | Compound (11) 1.1 | Disoap of aluminum octylate 0.75 | 21.8 | 14 days or longer | ◎ | ◎ | ◎ |
| Example 58 | 1.5 | 0.4 | Compound (11) 1.1 | Disproportionated rosin 0.75 | 22.6 | 14 days or longer | ◎ | ◎ | ◎ |
| Example 59 | 1.5 | 0.4 | Compound (11) 1.1 | C21 carboxylate 0.75 | 23.5 | 14 days or longer | ◎ | ◎ | ◎ |
| Example 60 | 1.5 | 0.4 | Compound (11) 1.1 | C-12 potassium alkenyl succinate 0.75 | 22.8 | 14 days or longer | ◎ | ◎ | ◎ |
| Example 61 | 1.5 | 0.4 | Compound (11) 1.1 | Paraffin wax + low-molecular-weight polyethylene 0.75 | 23.4 | 14 days or longer | ◎ | ◎ | ◎ |
| Example 62 | 1.5 | 0.4 | Compound (11) 1.1 | Styrene-based polymer 0.75 | 22.7 | 14 days or longer | ◎ | ◎ | ◎ |
| Example 63 | 1.5 | 0.4 | Compound (11) 1.1 | Alkyl methacrylate polymer 0.75 | 20.1 | 14 days or longer | ◎ | ◎ | ◎ |
| Example 64 | 1.5 | 0.4 | Compound (11) 1.1 | low-molecular-weight polyethylene 0.75 | 23.1 | 14 days or longer | ◎ | ◎ | ◎ |
| Example 65 | 1.5 | 0.4 | Compound (11) 1.1 | Ethylene-based thermoplastic elastomer 0.75 | 20.3 | 14 days or longer | ◎ | ◎ | ◎ |
| Example 66 | 1.5 | 0.4 | Compound (11) 1.1 | Ethylene-vinyl acetate copolymer resin 0.75 | 20 | 14 days or longer | ◎ | ◎ | ◎ |
| Example 67 | 1.5 | 0.4 | Compound (12) 1.1 | Low-density polyethylene 0.75 | 20.2 | 14 days or longer | ◎ | ◎ | ◎ |
| Example 68 | 1.5 | 0.4 | Compound (12) 1.1 | Petroleum resin emulsion 0.75 | 26.8 | 14 days or longer | ◎ | ◎ | ◎ |

Compound (11): dihydroxytitanium lactate
Compound (12): tetrahydroxyaluminum adipate

TABLE 7

| | Addition of chemical (same day) | | | | | | | |
|---|---|---|---|---|---|---|---|---|
| | Colloidal calcium hydroxide (part by weight) | Crosslinking agent (part by weight) | Hydrophobic substance (part by weight) | Tensile strength MpA | Durability | Creep resistance | Water resistance | Non-cohesiveness |
| Example 69 | 0.49 | Compound (11) 0.8 | C-12 potassium alkenyl succinate 0.75 | 21.5 | 14 days or longer | ◎ | ◎ | ◎ |
| Example 70 | 0.49 | Compound (11) 0.8 | Petroleum resin emulsion 0.75 | 22.3 | 14 days or longer | ◎ | ◎ | ◎ |
| Example 71 | 0.49 | Compound (11) 0.8 | Low-molecular-weight polyethylene 0.75 | 20.8 | 14 days or longer | ◎ | ◎ | ◎ |

Compound (11): dihydroxytitanium lactate

Examples 72 to 90

A rubber latex molded article having the following composition was further produced in order to evaluate an effect of a polyamide- or polyvinyl alcohol-based compounds. Raw materials used, the composition of a blended liquid, and the like were shown in the following description or Table 8.
(Latex Used)
NBR latex LX550L (manufactured by ZEON CORPORATION)
ZnO 1.3 parts
Ammonia The addition amount of ammonia was adjusted in such a manner that the pH of a latex prepared liquid fell within the range of 9.0 to 9.5. The cationic property of a polymer containing an amine group was deactivated by adding ammonia to the compound before the polymer was blended into the latex.
(Blending Compounds)
(Hydrophobic substance)
  F1: reinforced rosin FR1900 (manufactured by SEIKO PMC CORPORATION)
(Added Water-Soluble Polymer)
Polyvinyl Alcohol-Based (V)
(Anionic Polyvinyl Alcohol)
  V1: GOHSENAL P-7000 (manufactured by Nippon Synthetic Chemical Industry CO., Ltd)
(Nonionic Polyvinyl Alcohol)
  V2: GOHSESIZE P-7100 (manufactured by Nippon Synthetic Chemical Industry CO., Ltd)
(Cationic Property-Deactivated Polyvinyl Alcohol)
  V3: GOHSEFIMER K-210 (manufactured by NipponSyntheticChemical Industry CO., Ltd)
Polyacrylamide-Based
(Nonionic Polyacrylamide)
  A1: HARICOAT 6045 (manufactured by Harima Chemicals, Inc.)
(Anionic Polyacrylamide)
  A2: ST5000 (manufactured by SEIKO PMC CORPORATION)
(Cationic Property-Deactivated Amphoteric Polyacrylamide)
  A3:DS4395 (manufactured by SEIKO PMC CORPORATION)
(Cationic Property-Deactivated Amine Group-Containing Polyacrylamide)
  A4: cationic property-deactivated amine group-containing polyacrylamide, FX7200 (manufactured by SEIKO PMC CORPORATION)
(Modified Polyamine-Based Resin)
  H1: modified polyamine-based resin PA6650 (manufactured by SEIKO PMC CORPORATION)
(Cationic Property-Deactivated Polyamide-Epichlorohydrin Resin)
  W1: cationic property-deactivated polyamide-epichlorohydrin resin, WS4030 (manufactured by SEIKO PMC CORPORATION)
  W2: cationic property-deactivated polyamine-epichlorohydrin resin, WS4052 (manufactured by SEIKO PMC CORPORATION)
(Note) The water-soluble resin was added to a solution prepared by adding ammonia (0.5 part) and FR-1900 (1.0 part), and then the resultant mixture was added to the latex.
(Cationic Property-Deactivated Water-Soluble Cation Starch)
  D1: cationic property-deactivated liquid cation starch DD4280 (manufactured by SEIKO PMC CORPORATION)
(Water Resistant (T))
  T1: dihydroxyaluminum lactate (manufactured by TAKI CHEMICAL CO., LTD.)
  T2: cationic property-deactivated modified polyamine-based resin, PA6650 (manufactured by SEIKO PMC CORPORATION)
  T3: ammonium zirconium carbonate, BAYCOAT20 (calculated as $ZrO_2$) (manufactured by Nippon Light Metal Co., Ltd.)
(Cationization Agent)
  K1: N-(3-chloro-2-hydroxypropyl)trimethylammonium-chloride (manufactured by Dow USA)
(Surface Treatment)
A surface treatment for a film corresponding to a treatment for the back surface of a glove was performed. A method for the treatment is the same as that for the above surface treatment. A 0.75% liquid of an anionic styrene-acrylic resin (T-XP118, manufactured by SEIKO PMC CORPORATION) is used as a treatment liquid. A dip-formed article is non-cohesive.
An anionic hydrophobic compound also imparts non-cohesiveness to a product as in the case of a cationic hydrophobic compound because a latex blended liquid is blended with a crosslinking agent or hydrogen bond forming agent that interacts with a carboxyl group.
It should be noted that examples of the anionic hydrophobic substance include anionic polymers out of the polymers each belonging to the above surface sizing agent such as an anionic styrene-acrylic copolymer-based resin, an anionic styrene-acrylic resin, an anionic acrylic copolymer-based resin, an anionic olefin-maleic acid-based resin, an anionic urethane-based resin, and an anionic long-chain alkyl-containing polymer peeling agent; any such anionic polymer functions also as a hydrophobic substance, a non-cohesiveness imparting agent, or a peeling agent. In addition, rosin, a rosin emulsion, an esterified rosin emulsion, an alkenyl succinic acid, an alkylketene dimer, or the like also has a non-cohesiveness imparting effect.

(Test Items)

Tensile Strength

Detergent resistance test: A sample is dipped into a 2% liquid of sodium dodecylbenzenesulfonate at 55° C. for 22 hours, and then its tensile strength is measured.

Durability in dry state: One wore a produced finger cot for 2 days while the finger cot was out of contact with water, and then the finger cot was tested for durability.

Initial water resistance: One performed water work while wearing a produced finger cot, and the swollen state of the finger cot was observed.

Water resistance after wearing: One wore a produced finger cot for 5 hours. After that, he or she performed water work, and the swollen state of the finger cot was observed.

Table 8 shows the results.

(Evaluation)

A dip-formed article to which a polyacrylamide, a polyvinyl alcohol-based chemical, a modified polyamine-based resin, or a cationizing agent has been added does not creep even when one wears the product, and has sufficient durability in a state where the product is out of contact with water.

When the dip-formed article is brought into contact with water, the dip-formed article shows good water resistance in the early stage of the wearing. However, after he or she has worn the product for several hours, the product rapidly absorbs water to swell in the case where a nonionic or anionic polymer is added to the product. It should be noted that, when he or she continues to wear the product while stopping bringing the product into contact with water, the shape of the product returns to the original one as the product dries.

On the other hand, a dip-formed article to which a modified polyamine-based resin, or a cationic property-deactivated polyvinyl alcohol, polyacrylamide, polyamide-epichlorohydrin resin, polyamine-epichlorohydrin resin, or carbohydrate has been added shows good water resistance even after one has worn the product.

In addition, a dip-formed article to which a nonionic or anionic polyacrylamide, polyvinyl alcohol, or carbohydrate with any one of various water resistant additives added in a small amount had been added showed good water resistance even after one had worn the product, and had durability, creep resistance, and non-cohesiveness.

Further, a cationizing agent for cationizing a latex or a chemical to be blended into a prepared liquid functioned as a water resistant additive, and a product blended with a cationizing agent alone showed good water resistance even after one had worn the product.

TABLE 8

| Example | 72 | 73 | 74 | 75 | 76 | 77 | 78 | 79 | 80 | 81 |
|---|---|---|---|---|---|---|---|---|---|---|
| Hydrophobic substance | F1 | F1 | F1 | F1 | F1 | F1 | F1 | F1 | F1 | F1 |
| Addition amount (part) | 0.75 | 0.75 | 0.75 | 0.75 | 0.75 | 0.75 | 0.75 | 0.75 | 0.75 | 0.75 |
| Water-soluble polymer |  | V1 | V1 | V2 | A1 | A1 | A1 | A1 | A1 | A2 |
| Addition amount (part) |  | 0.5 | 0.5 | 0.5 | 0.8 | 0.5 | 0.5 | 0.5 | 0.5 | 1 |
| Water resistant additive | T1 |  | T1 | T3 |  | T1 | T2 | T3 | K1 |  |
| Addition amount (part) | 0.8 |  | 0.1 | 0.1 |  | 0.1 | 0.1 | 0.1 | 0.1 |  |
| Tensile strength (MPa) | 33.5 | 33.4 | 35.3 | 35.4 | 40 | 34.2 | 38.5 | 37.8 | 37.6 | 41.5 |
| Detergent resistance (MPa) | 19.3 | 19.3 | 18.5 | 18.2 | 18.4 | 17.3 | 19.3 | 19.6 | 18.6 | 14.2 |
| Durability in dry state | ○ | ○ | ○ | ○ | ○ | ○ | ○ | ○ | ○ | ○ |
| Water resistance in early stage of wearing | ○ | ○ | ○ | ○ | ○ | ○ | ○ | ○ | ○ | ○ |
| Water resistance after wearing for 5 hours | ○ | X | ○ | ○ | X | ○ | ○ | ○ | ○ | X |
| Remark |  |  |  |  | In terms of $ZrO_2$ |  |  |  | In terms of $ZrO_2$ |  |

| Example | 82 | 83 | 84 | 85 | 86 | 87 | 88 | 89 | 90 |
|---|---|---|---|---|---|---|---|---|---|
| Hydrophobic substance | F1 | F1 | F1 | F1 | F1 | F1 | F1 | F1 | F1 |
| Addition amount (part) | 0.75 | 0.75 | 0.75 | 0.75 | 0.75 | 1 | 1 | 1 | 1 |
| Water-soluble polymer | A2 | H1 | A3 | A4 | K1 | W1 | W2 | V3 | D1 |
| Addition amount (part) | 0.8 | 0.5 | 0.5 | 0.5 | 0.5 | 0.5 | 0.5 | 0.5 | 0.5 |
| Water resistant additive | T1 |  |  |  |  |  |  |  |  |
| Addition amount (part) | 0.1 |  |  |  |  |  |  |  |  |
| Tensile strength (MPa) | 37.2 | 41.3 | 39.3 | 34.2 | 35.4 | 37.5 | 39.3 | 38.3 | 35.4 |
| Detergent resistance (MPa) | 18.5 | 18 | 15.8 | 19.6 | 17.5 | 17.5 | 14.7 | 16.4 | 17.5 |
| Durability in dry state | ○ | ○ | ○ | ○ | ○ | ○ | ○ | ○ | ○ |
| Water resistance in early stage of wearing | ○ | ○ | ○ | ○ | ○ | ○ | ○ | ○ | ○ |
| Water resistance after wearing for 5 hours | ○ | ○ | ○ | ○ | ○ | ○ | ○ | ○ | ○ |
| Remark |  |  |  |  |  |  |  |  |  |

Examples 91 to 95

A rubber latex molded article having the following composition was further produced in order to evaluate an effect of a water-resistant polyvinyl alcohol, and starch added with water-resistant polymer. Raw materials used, the composition of a blended liquid, and the like were shown in the following description or Table 9.
(Latex Used)
NBR latex LX550L (manufactured by ZEON CORPORATION)
ZnO 1.3 parts
Ammonia The addition amount of ammonia was adjusted in such a manner that the pH of a latex prepared liquid fell within the range of 9.0 to 9.5. The cationic property of a polymer containing an amine group was deactivated by adding ammonia to the compound before the polymer was blended into the latex.
(Blending Compounds)
(Hydrophobic Substance)
  F1: reinforced rosin FR1900 (manufactured by SEIKO PMC CORPORATION)
(Added Water-Soluble Polymer)
Polyvinyl Alcohol-Based (V)
(Water-Resistant Polyvinyl Alcohol)
  VT1: ethylene-modified polyvinyl alcohol, EXCEVAL RS2117 (manufactured by Kuraray CO., Ltd)
  VT2: polyvinyl alcohol with a thiol group at its end, KURARAY POVAL (manufactured by Nippon Synthetic Chemical Industry CO., Ltd)
(Anionic Polyvinyl Alcohol)
  V2: GOHSESIZE P-7100 (manufactured by Nippon Synthetic Chemical Industry CO., Ltd)
(Anionic Polyacrylamide)
  A2: ST5000 (manufactured by SEIKO PMC CORPORATION) (Starch)
  D2: Oxidized starch, AceB (manufactured by Oji Cornstarch CO., Ltd)
(Water-Resistant Polymer)
  WP1: olefin-based surface sizing agent (anion), PM1329 (manufactured by Arakawa Chemical Industries, Ltd.)
  WP2: olefin-acryl-based surface sizing agent (anion), PM1308S (manufactured by Arakawa Chemical Industries, Ltd.)
  WP3: styrene-based surface sizing agent (cation), SS2720 (manufactured by SEIKO PMC CORPORATION)

Dip-formed articles were prepared from each of the compositions, and subject to surface treatment, and the properties thereof were evaluated in the same way as Examples 72 to 90. Table 9 shows the results.
(Evaluation)
Dip-formed articles to which water-resistant polyvinyl alcohol including a nonionic polyvinyl alcohol and anionic polyvinyl alcohol have been added has sufficient durability without adding water resistant additives.

Examples of water-resistant polyvinyl alcohol include modified polyvinyl alcohol comprising olefin unit of three carbon atoms or less, modified polyvinyl alcohol having thiol group at its end, and anionic reactive polyvinyl alcohol such as butanedioic acid, 2-methylene, polymer with ethenyl acetate.

Furthermore, dip-formed articles to which anionic polyvinyl alcohol, anionic polyacrylamide, or starch has been added have sufficient durability when water resistant polymer is added together.

Examples of water resistant polymer include, but not limited to, polymers which can be used as surface sizing agent.

TABLE 9

| Example | 91 | 92 | 93 | 94 | 95 |
|---|---|---|---|---|---|
| Hydrophobic substance | F1 | F1 | F1 | F1 | F1 |
| Addition amount (part) | 0.75 | 0.75 | 0.75 | 0.75 | 0.75 |
| Water-soluble polymer | VT1 | VT2 | V2 | A2 | D2 |
| Addition amount (part) | 0.8 | 0.8 | 0.8 | 0.8 | 0.8 |
| Water resistant polymer | | | WP1 | WP2 | WP3 |
| Addition amount (part) | | | 0.5 | 0.5 | 0.5 |
| Tensile strength (MPa) | 36.4 | 35.3 | 33.2 | 35.8 | 36.2 |
| Detergent resistance (MPa) | 18.3 | 19.2 | 16.5 | 17.2 | 15.4 |
| Durability in dry state | ○ | ○ | ○ | ○ | ○ |
| Water resistance in early stage of wearing | ○ | ○ | ○ | ○ | ○ |
| Water resistance after wearing for 5 hours | ○ | ○ | ○ | ○ | ○ |

INDUSTRIAL APPLICABILITY

As described above, the present invention provides a novel, stable carboxyl group crosslinking agent having two or more hydroxyl groups each bonded to an aluminum atom. In addition, the addition of an organometallic compound having two or more hydroxyl groups each bonded to a titanium atom to a carboxyl group-containing latex results in a composition for molding which has high mechanical stability and agglomerates to a small extent.

The present invention also relates to a carboxyl group-containing diene-based rubber latex composition including a carboxyl group-containing diene-based rubber latex and one or more compounds selected from (c) a cationic property-deactivated modified polyamine-based resin, a cationic property-deactivated polyamide-epichlorohydrin resin, a cationic property-deactivated polyamine-epichlorohydrin resin, a cationic property-deactivated amine group- or quaternary ammonium base-containing polyvinyl alcohol, a cationic property-deactivated amine group- or quaternary ammonium base-containing polyacrylamide, a cationic property-deactivated amine group- or quaternary ammonium base-containing carbohydrate, or polyacrylamide, polyvinyl alcohol, or carbohydrate into which a crosslinkable functional group is introduced, (d) an anionic or nonionic polyvinyl alcohol, anionic or nonionic polyacrylamide, or anionic or nonionic carbohydrate to which water resistant additive is added (e) a cationization agent and relates to a crosslinked molded article of the composition.

The use of the composition for molding of the present invention can result in a dip-formed article excellent in durability, creep resistance, and water resistance, and having peeling property, and can result in, for example, a rubber glove to be widely used in various fields including a medical field, a food processing field, and an electronic part production field.

Further, for example, a paper product excellent in blocking resistance, water resistance, and durability can be obtained by internally adding the above composition to paper or the like, or by impregnating or coating the paper or the like with the composition.

The invention claimed is:
1. A carboxyl group-containing diene-based rubber latex composition, comprising:
   a carboxyl group-containing diene-based rubber latex; and
   an internal organometallic crosslinking agent containing one or more metal atom which is bonded to one or two carboxylate group of a carboxylic acid and two or more hydroxyl groups which are bonded to the metal atom, wherein the metal atom is aluminum or titanium.

2. The carboxyl group-containing diene-based rubber latex composition according to claim 1, further comprising one or more compounds selected from the group consisting of:
  (a) a cationic property-deactivated modified polyamine-based resin, a cationic property-deactivated polyamide-epichlorohydrin resin, a cationic property-deactivated polyamine-epichlorohydrin resin, a cationic property-deactivated amine group- or quaternary ammonium base-containing polyvinyl alcohol, a cationic property-deactivated amine group- or quaternary ammonium base-containing polyacrylamide, a cationic property-deactivated amine group- or quaternary ammonium base-containing carbohydrate, or a polyacrylamide, polyvinyl alcohol, or carbohydrate into which a crosslinkable functional group is introduced;
  (b) an anionic or nonionic polyvinyl alcohol, anionic or nonionic polyacrylamide, or anionic or nonionic carbohydrate to which a water resistant additive or water-resistant polymer is added;
  (d) a cationizing agent;
  (e) one or more organic compounds selected from a hydrophobic substance, a hydrophobic group-containing carboxylic acid or a salt thereof, an aluminum disoap or trisoap of a hydrophobic group-containing carboxylic acid, and a metal soap of a hydrophobic group-containing carboxylic acid;
  (f) a water-soluble polymer; and
  (g) magnesium hydroxide and/or calcium hydroxide.

3. A cross-linked article which is obtained by crosslinking the composition according to claim 1.

4. A cross-linked article which is obtained by crosslinking the composition according to claim 2.

5. The cross-linked article according to claim 3, wherein a surface of the article is treated with a cationic carboxyl group blocking agent and/or an anionic hydrophobic compound.

6. The cross-linked article according to claim 4, wherein a surface of the article is treated with a cationic carboxyl group blocking agent and/or an anionic hydrophobic compound.

7. The crosslinked article according to claim 3, wherein said article is a dip-formed article.

8. The article according to claim 7, wherein a surface of the article is treated with a cationic carboxyl group blocking agent and/or an anionic hydrophobic compound.

9. The crosslinked article according to claim 4, wherein said article is a dip-formed article.

10. The article according to claim 9, wherein a surface of the article is treated with a cationic carboxyl group blocking agent and/or an anionic hydrophobic compound.

11. The carboxyl group-containing diene-based rubber latex composition according to claim 1, wherein said organometallic crosslinking agent comprises one or more organometallic compounds each having a structure selected from the following formulae (1), (2), (3), and (4):

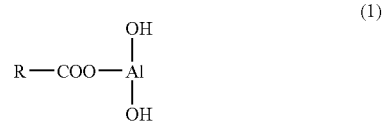

R represents a saturated or unsaturated aliphatic group, or an aromatic group;

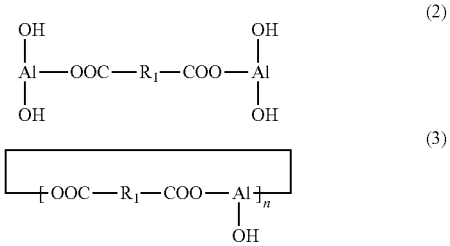

n represents an integer of 2 or more, and $R_1$ represents a saturated or unsaturated divalent aliphatic group, or a divalent aromatic group;

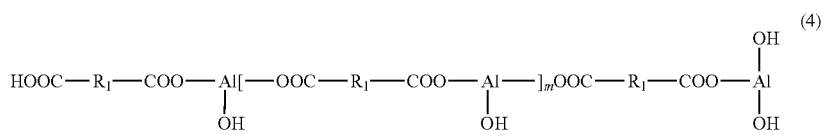

m represents 0, or an integer of 1 or more, and $R_1$ represents a saturated or unsaturated divalent aliphatic group, or a divalent aromatic group.

12. A crosslinked article which is obtained by crosslinking the composition according to claim 11.

13. The crosslinked article according to claim 12, wherein a surface of the article is treated with a cationic carboxyl group blocking agent and/or an anionic hydrophobic compound.

14. The carboxyl group-containing diene-based rubber latex composition according to claim 1, further comprising a water resistant polyvinyl alcohol.

15. A crosslinked article which is obtained by crosslinking composition according to claim 14.

16. The crosslinked article according to claim 15, wherein a surface of the article is treated with a cationic carboxyl group blocking agent and/or an anionic hydrophobic compound.

17. The crosslinked article according to claim 15, wherein said article is a dip-formed article.

18. The article according to claim 17, wherein a surface of the article is treated with a cationic carboxyl group blocking agent and/or an anionic hydrophobic compound.

19. The carboxyl group-containing diene-based rubber latex composition according to claim 1, wherein said organometallic crosslinking agent is dihydroxybis (hydroxycarboxylate)titanium.

* * * * *